United States Patent
Ockenfuss

(10) Patent No.: US 10,782,460 B2
(45) Date of Patent: Sep. 22, 2020

(54) MULTISPECTRAL FILTER

(71) Applicant: Viavi Solutions Inc., Milpitas, CA (US)

(72) Inventor: Georg J. Ockenfuss, Santa Rosa, CA (US)

(73) Assignee: VIAVI Solutions Inc., San Jose, CA (US)

(*) Notice: Subject to any disclaimer, the term of this patent is extended or adjusted under 35 U.S.C. 154(b) by 579 days.

(21) Appl. No.: 15/601,753

(22) Filed: May 22, 2017

(65) Prior Publication Data
US 2018/0335557 A1 Nov. 22, 2018

(51) Int. Cl.
*G02B 5/28* (2006.01)
*G02B 5/20* (2006.01)

(52) U.S. Cl.
CPC ............. *G02B 5/286* (2013.01); *G02B 5/201* (2013.01); *G02B 5/207* (2013.01); *G02B 5/28* (2013.01); *G02B 5/281* (2013.01); *G02B 5/288* (2013.01)

(58) Field of Classification Search
CPC ......... G02B 5/286; G02B 5/201; G02B 5/207
USPC ....................................................... 359/359
See application file for complete search history.

(56) References Cited

U.S. PATENT DOCUMENTS

| | | | |
|---|---|---|---|
| 2003/0048985 A1 | 3/2003 | Hulse | |
| 2007/0224814 A1* | 9/2007 | Le | G02B 5/284 438/689 |
| 2008/0035846 A1 | 2/2008 | Talghader et al. | |
| 2009/0059346 A1* | 3/2009 | Xu | G02B 5/0858 359/291 |
| 2014/0247481 A1 | 9/2014 | Fasold et al. | |
| 2017/0186793 A1* | 6/2017 | Ockenfuss | H01L 27/1462 |

FOREIGN PATENT DOCUMENTS

| | | |
|---|---|---|
| WO | WO 99/36811 A1 | 7/1999 |
| WO | WO 00/45201 A1 | 8/2000 |
| WO | WO 00/63728 A1 | 10/2000 |
| WO | WO 2017/000069 A1 | 1/2017 |

OTHER PUBLICATIONS

Extended European Search Report corresponding to EP 18170865.2 dated Oct. 11, 2018, 10 pages.
Macleod, "Thin-Film Optical Filters", Fourth Edition, Series in Optics and Optoelectronics, 2010, 791 pages.
Thelen "Design of optical Interference Coatings", SPIE vol. 1782 Thin Films for Optical System (1992) 6 pages.

* cited by examiner

*Primary Examiner* — Thomas K Pham
*Assistant Examiner* — Mitchell T Oestreich
(74) *Attorney, Agent, or Firm* — Harrity & Harrity, LLP

(57) ABSTRACT

An optical filter may include a substrate. The optical filter may include a first mirror and a second mirror. Each of the first mirror and the second mirror may include a plurality of quarterwave stacks. The plurality of quarterwave stacks may include a plurality of layers comprising a first material, a second material, and a third material. The optical filter may include a spacer disposed between the first mirror and the second mirror.

20 Claims, 24 Drawing Sheets

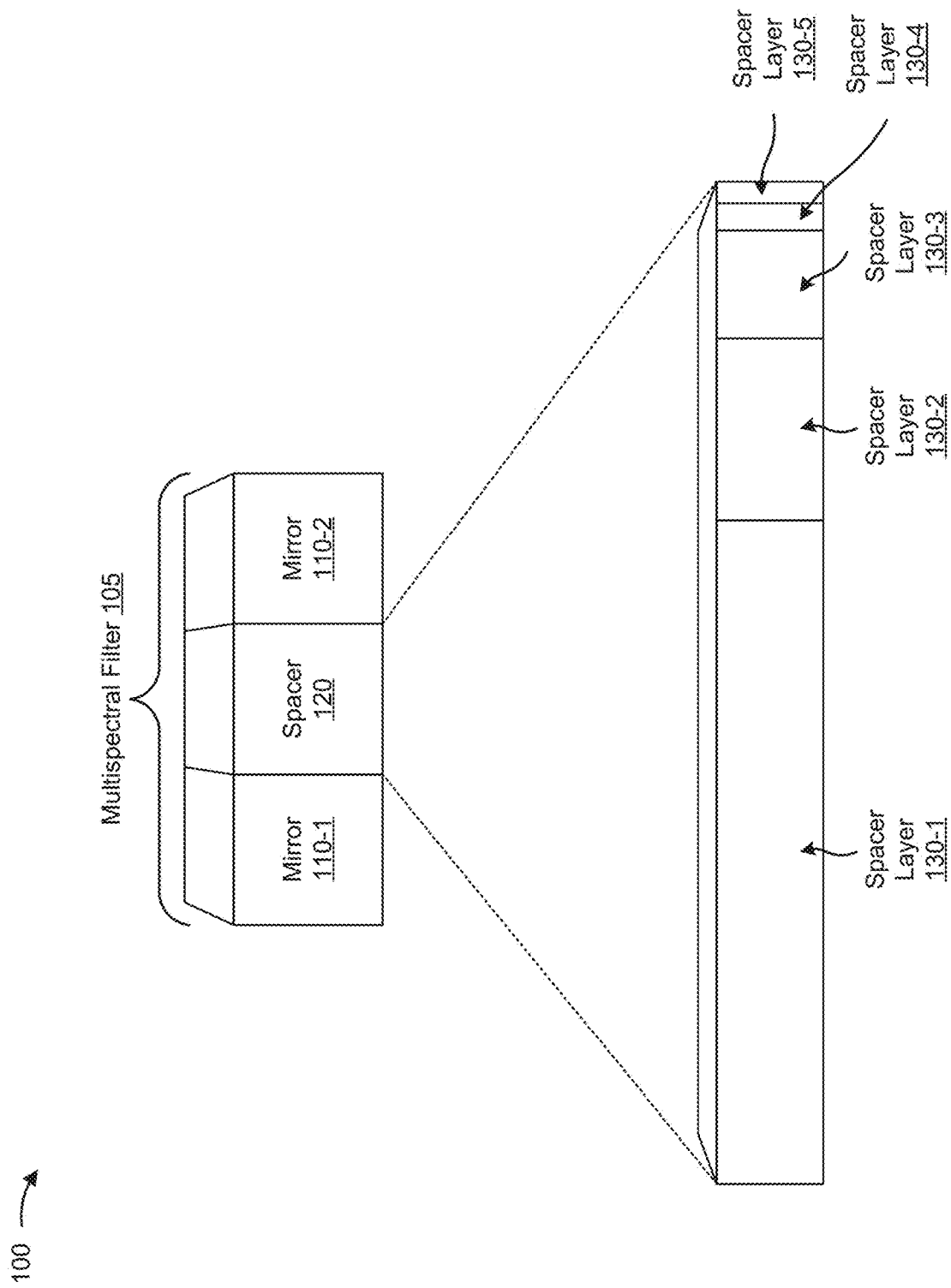

| Layer # | Material Name | n | # of QW | Phys Thick (nm) | Q.W.O.T. |
|---|---|---|---|---|---|
| substrate | | | | | Matched |
| 1 | Si_H | 3.7226 | 1 | 62.6 | 932 |
| 2 | SiO2 | 1.4664 | 1 | 158.9 | 932 |
| 3 | Si_H | 3.7226 | 1 | 62.6 | 932 |
| 4 | SiO2 | 1.4664 | 1 | 158.9 | 932 |
| 5 | Si_H | 3.7226 | 2 | 125.2 | 1864 |
| 6 | SiO2 | 1.4664 | 1 | 158.9 | 932 |
| 7 | Si_H | 3.7226 | 1 | 62.6 | 932 |
| 8 | SiO2 | 1.4664 | 1 | 158.9 | 932 |
| 9 | Si_H | 3.7226 | 1 | 62.6 | 932 |
| air | | | | | |

FIG. 2A

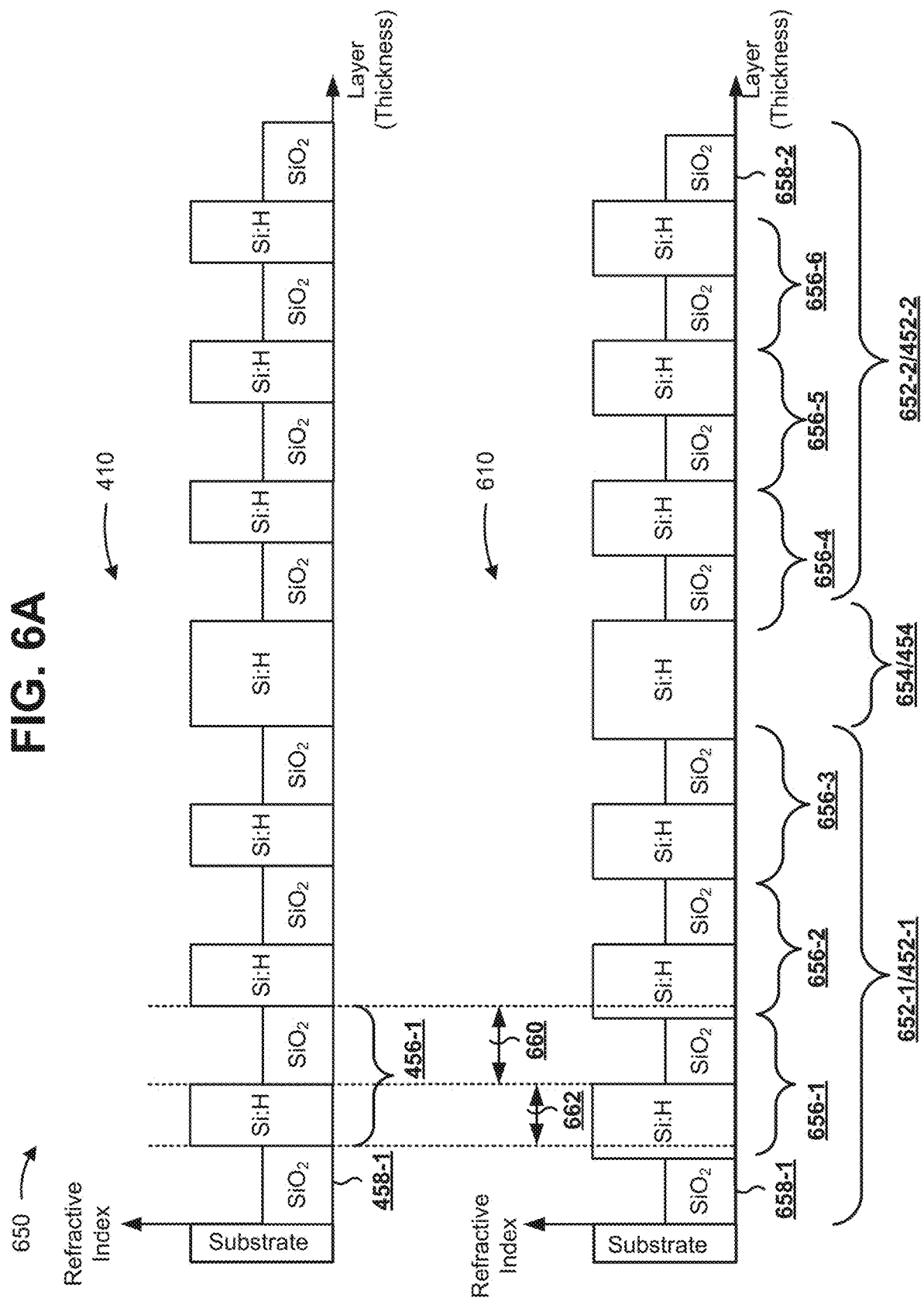

| Filter | Bandwidth [nm] |
|---|---|
| Filter 210 | 5.3 |
| Filter 310 | 0.9 |
| Filter 410 | 1.4 |
| Filter 510 | 3.1 |
| Filter 610 | 2.0 |
| Filter 710 | 2.8 |
| Filter 740 | 3.1 |
| Filter 760 | 5.3 |
| Filter 780 | 3.0 |

MULTISPECTRAL FILTER

BACKGROUND

A multispectral sensor device may be utilized to capture information. For example, the multispectral sensor device may capture information relating to a set of electromagnetic frequencies. The multispectral sensor device may include a set of sensor elements (e.g., optical sensors, spectral sensors, and/or image sensors) that capture the information. For example, an array of sensor elements may be utilized to capture information relating to multiple frequencies. A particular sensor element, of the sensor element array, may be associated with a filter that restricts a range of frequencies that are directed toward the particular sensor element. The filter may be associated with a particular bandwidth corresponding to a width of a spectral range that the filter passes toward the particular sensor element.

SUMMARY

According to some possible implementations, an optical filter may include a first mirror and a second mirror. Each of the first mirror and the second mirror may include a first one or more quarterwave stacks. A quarterwave stack, of the first one or more quarterwave stacks, may include a set of alternating layers of a first material and a second material. The first material may be associated with a higher refractive index than the second material. Each of the first mirror and the second mirror may include a second one or more quarterwave stacks. A quarterwave stack, of the second one or more quarterwave stacks, may include one or more alternating layers of a third material and a fourth material. The third material may be associated with a higher refractive index than the fourth material. The first material, the second material, the third material, and the fourth material may include three or more different materials. The optical filter may include a spacer disposed between the first mirror and the second mirror.

According to some possible implementations, a multispectral filter may include a first set of dielectric layers to reflect a portion of light directed toward the first set of dielectric layers. The first set of dielectric layers may include a first one or more quarterwave stacks. The first set of dielectric layers may include a first set of three or more different materials. The multispectral filter may include a set of spacer layers. A layer, of the set of spacer layers, may be selected based on a refractive index of the layer and corresponding to a wavelength of light that is to be directed toward a sensor element, of a set of sensor elements, corresponding to a channel of a set of channels formed by the set of spacer layers. The multispectral filter may include a second set of dielectric layers to reflect a portion of light directed toward the second set of dielectric layers. The second set of dielectric layers may include a second one or more quarterwave stacks. The second set of dielectric layers may include a second set of three or more different materials.

According to some possible implementations, an optical filter may include a substrate. The optical filter may include a first mirror and a second mirror. Each of the first mirror and the second mirror may include a plurality of quarterwave stacks. The plurality of quarterwave stacks may include a plurality of layers comprising a first material, a second material, and a third material. The optical filter may include a spacer disposed between the first mirror and the second mirror.

BRIEF DESCRIPTION OF THE DRAWINGS

FIG. 1 is a diagram of an overview of an example implementation described herein;

FIGS. 2A-2D are diagrams of characteristics relating to a multispectral filter described herein;

FIGS. 6A-6C are diagrams of characteristics relating to a multispectral filter described herein;

FIGS. 8A and 8B are diagrams of characteristics relating to a multispectral filter described herein.

DETAILED DESCRIPTION

Figure 2B:
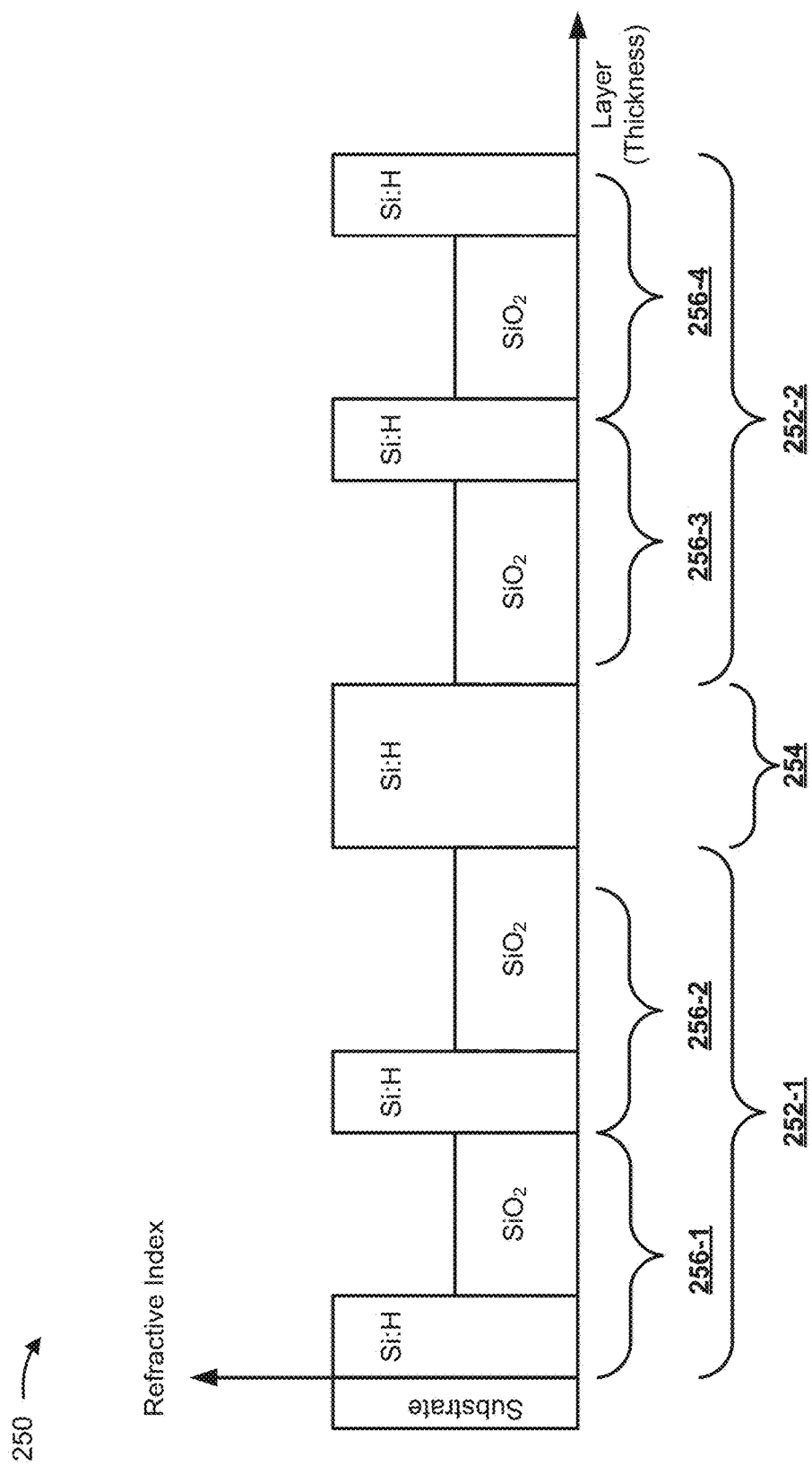

The following detailed description of example implementations refers to the accompanying drawings. The same reference numbers in different drawings may identify the same or similar elements.

A sensor element (e.g., an optical sensor) may be incorporated into an optical sensor device to obtain information (e.g., spectral data) regarding a set of electromagnetic frequencies. For example, the optical sensor device may include an image sensor, a multispectral sensor, or the like that may perform a sensor measurement of light. The optical sensor device may utilize one or more sensor technologies, such as a complementary metal-oxide-semiconductor (CMOS) technology, a charge-coupled device (CCD) technology, or the like. The optical sensor device may include multiple sensor elements (e.g., an array of sensor elements) each configured to obtain information.

A sensor element may be associated with a filter that filters light to the sensor element. For example, the sensor element may be aligned with a linear variable filter (LVF), a circular variable filter (CVF), a Fabry-Perot filter, or the like to cause a portion of light directed toward the sensor element to be filtered. For a binary filter structure, such as a Fabry-Perot filter, hydrogenated silicon (Si:H) may be selected for layers of a spacer that is positioned between mirrors of a filter. The mirrors may be manufactured from metal layers (e.g., silver) or dielectric layers (e.g., quarterwave stacks of alternating high-index layers and low-index layers (HL pairs)). For example, a multispectral filter may include a first mirror, which includes a set of quarterwave stacks of alternating hydrogenated silicon layers and silicon dioxide layers, and a second mirror, which includes another set of quarterwave stacks of alternating hydrogenated silicon layers and silicon dioxide layers. The multispectral filter may result in a particular filter response. For example, the multispectral filter may be associated with a particular center wavelength of a spectral range passed toward the sensor, a particular bandwidth of the spectral range passed toward the sensor element, or the like. The filter response may be altered by altering a thickness of the spacer or by altering the quantity of quarterwave stacks between which the spacer is positioned.

However, altering the thickness of the spacer for a single cavity type of filter and/or altering a quantity of quarterwave stacks may result in a change to the filter response that exceeds a threshold. For example, an alteration from a set of two hydrogenated silicon and silicon dioxide quarterwave stacks to a set of three hydrogenated silicon and silicon dioxide quarterwave stacks may reduce a bandwidth of a filter from a first bandwidth that is greater than a first threshold to a second bandwidth that is less than a second threshold. Implementations, described herein, may utilize a mixed quarterwave stack configuration, an altered quarterwave stack layer thickness, or the like to permit altering a multispectral filter response. For example, implementations, described herein, may utilize three or more coating materials for quarterwave stacks of a multispectral filter. In this case, a filter response of a multispectral filter may be changed from, for example, an initial bandwidth that is greater than the first threshold to a target bandwidth that is between the first threshold and the second threshold. In this way, a greater granularity in tuning of multispectral filter performance is achieved.

FIG. 1 is a diagram of an overview of an example implementation 100 described herein. As shown in FIG. 1, a multispectral filter 105 (e.g., a binary structure optical filter array) may include a first mirror 110-1, a second mirror 110-2, and a spacer 120.

As further shown in FIG. 1, first mirror 110-1 and second mirror 110-2 may sandwich spacer 120. In other words, spacer 120 may separate first mirror 110-1 and second mirror 110-2 by a threshold distance, and/or faces of spacer 120 may be enclosed by first mirror 110-1 and second mirror 110-2. In some implementations, mirrors 110 may be associated with a particular material. For example, mirrors 110 may include a set of dielectric mirror layers (e.g., alternating hydrogenated silicon layers and silicon dioxide layers) or the like to reflect a portion of light directed from a light source toward sensor elements associated with multispectral filter 105. Mirrors 110 may align with each sensor element of a sensor element array associated with each channel of multispectral filter 105.

In some implementations, spacer 120 may include one or more spacer layers 130. For example, spacer 120 may include a set of spacer layers 130-1 through 130-5 (e.g., dielectric layers, such as hydrogenated silicon layers). In some implementations, a thickness of one or more spacer layers 130 may be associated with ensuring a minimum spacer thickness for a particular wavelength. In some implementations, spacer 120 may be associated with a single cavity configuration. Additionally, or alternatively, spacer 120 may be associated with a multi-cavity configuration.

In some implementations, a thickness of one or more spacer layers 130 may be related based on a binary progression. For example, spacer layer 130-3 may be associated with a thickness of approximately half a thickness of spacer layer 130-2, spacer layer 130-4 may be associated with a thickness of approximately half the thickness of spacer layer 130-3, and spacer layer 130-5 may be associated with a thickness of approximately half the thickness of spacer layer 130-4.

In some implementations, multispectral filter 105 may be deposited onto a substrate associated with an optical sensor device. For example, mirror 110-1 may be deposited (e.g., via a deposition process and/or a photolithographic lift-off process) onto a substrate that includes an array of sensor elements to capture information (e.g., spectral data). In some implementations, spacer 120 may permit capture of information relating to multiple wavelengths. For example, a first portion of spacer 120 aligned with a first sensor element (e.g., a back illuminated optical sensor or a front illuminated optical sensor of a sensor element array) may be associated with a first thickness and a second portion of spacer 120 aligned with a second sensor element may be associated with a second thickness. In this case, light, which is directed toward the first sensor element via a first channel corresponding the first portion and toward the second sensor element via a second channel corresponding to the second portion, may correspond to a first wavelength at the first sensor element based on the first thickness and a second wavelength at the second sensor element based on the second thickness. In this way, multispectral filter 105 permits multispectral sensing by an optical sensor device using a spacer (e.g., spacer 120) associated with multiple portions, which are associated with multiple thicknesses, aligned to multiple sensor elements of the optical sensor device.

As indicated above, FIG. 1 is provided merely as an example. Other examples are possible and may differ from what was described with regard to FIG. 1.

FIGS. 2A-2D are diagrams of characteristics relating to a multispectral filter. FIGS. 2A-2D show an example of a multispectral filter with a first set of two quarterwave stacks and a second set of two quarterwave stacks sandwiching a spacer.

As shown in FIG. 2A, and by chart 200, a filter 210 may include a substrate, a first set of two quarterwave stacks, a spacer, and a second set of two quarterwave stacks. The first set of quarterwave stacks include layers 1 through 4 of alternating hydrogenated silicon (shown as "Si_H" or sometimes termed Si:H) layers and silicon dioxide (shown as "SiO2") layers. The spacer may include layer 5 of hydrogenated silicon spacer. The second set of two quarterwave stacks include layers 6 through 9 of alternating hydrogenated silicon layers and silicon dioxide layers.

The hydrogenated silicon layers of the first quarterwave stack and the second quarterwave stack may each be associated with a refractive index of approximately 3.7226 at a spectral range of approximately 932 nm, a physical thickness of approximately 62.6 nm, and a quarterwave optical thickness (shown as "Q.W.O.T.") of approximately 932 nm. Quarterwave optical thickness of a layer corresponds to the physical thickness and refractive index of the layer. In some implementations, the high index layers of the quarterwave stacks (e.g., the hydrogenated silicon layers, which are associated with a higher index than the low-index layers of the quarterwave stack—the silicon dioxide layers) may be associated with a refractive index greater than a threshold value. For example, the high index layers may be associated with a refractive index, at a spectral range of approximately 800 nm to approximately 1100 nm, that is greater than approximately 2.0, approximately 2.5, approximately 3.0, approximately 3.5, approximately 3.6, approximately 3.7, or the like. In some implementations, a difference between a refractive index of the high index material layers and a refractive index of the low index material layers may be greater than a threshold, such as greater than approximately 1.0, greater than approximately 1.5, greater than approximately 2.0, or the like.

The silicon dioxide layers of the first set of two quarterwave stacks and the second set of two quarterwave stacks may each be associated with a refractive index of approximately 1.4664 at a spectral range of approximately 932 nm, a physical thickness of approximately 158.9 nm, and a quarterwave optical thickness of approximately 932 nm. In some implementations, the low index layers of the quarterwave stacks (e.g., the silicon dioxide layers) may be associated with a refractive index less than a threshold value at a spectral range of approximately 800 nm to approximately 1100 nm, such as a refractive index less than the refractive index of the high index layers, less than approximately 3.0, less than approximately 2.5, less than approximately 2.0, less than approximately 1.75, less than approximately 1.5, or the like.

The hydrogenated silicon spacer layer is associated with a refractive index of approximately 3.7226, a physical thickness of approximately 125.2 nm, and a quarterwave optical thickness of approximately 1864 nm. Although described herein as a hydrogenated silicon spacer layer, the hydrogenated silicon spacer layer may include multiple spacer layers of hydrogenated silicon of multiple thicknesses selected to form multiple channels. For example, in a first case, the hydrogenated silicon spacer layer may be formed using multiple layers to form 64 channels. Similarly, in a second case, the hydrogenated silicon spacer layer may be formed using multiple layers to form 128 channels. Additionally, or alternatively, a spacer layer may be utilized to form another threshold quantity of channels, such as 8 channels, 16 channels, 32 channels, 256 channels, or the like. In some implementations, the spacer layer may be associated with a refractive index greater than a threshold at a spectral range of approximately 800 nm to approximately 1100 nm, such as a refractive index greater than approximately 2.0, approximately 2.5, approximately 3.0, approximately 3.5, approximately 3.6, approximately 3.7, or the like.

As shown in FIG. 2B, chart 250 represents a refractive index profile of filter 210. As shown, filter 210 includes a substrate, a first mirror 252-1 deposited on the substrate, a second mirror 252-2, and a hydrogenated silicon spacer 254 disposed between first mirror 252-1 and second mirror 252-2. First mirror 252-1 includes a first quarterwave stack 256-1 and a second quarterwave stack 256-2. Similarly, second mirror 252-2 includes a third quarterwave stack 256-3 and a fourth quarterwave stack 256-4. Each quarterwave stack 256-1 through 256-4 includes a hydrogenated silicon layer and a silicon dioxide layer forming a high-index layer/low-index layer (HL) pair.

Figure 2C:
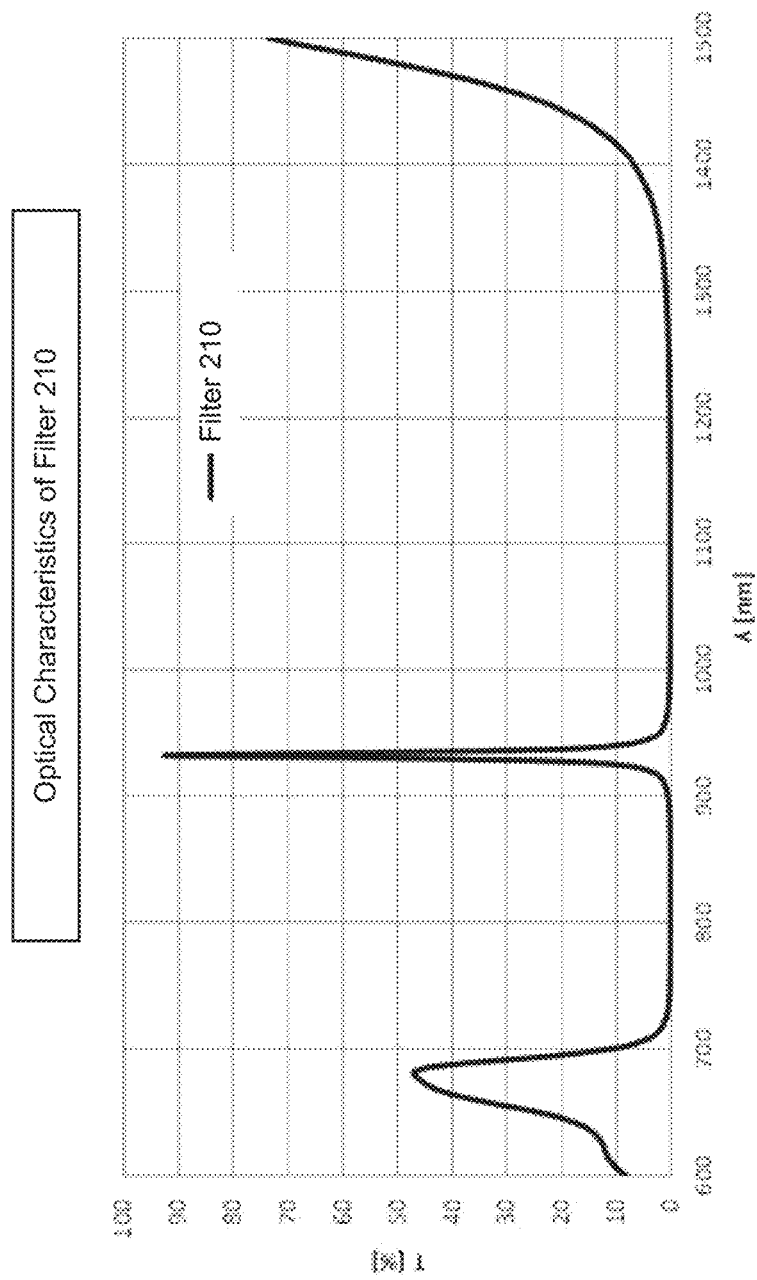
Figure 2D:
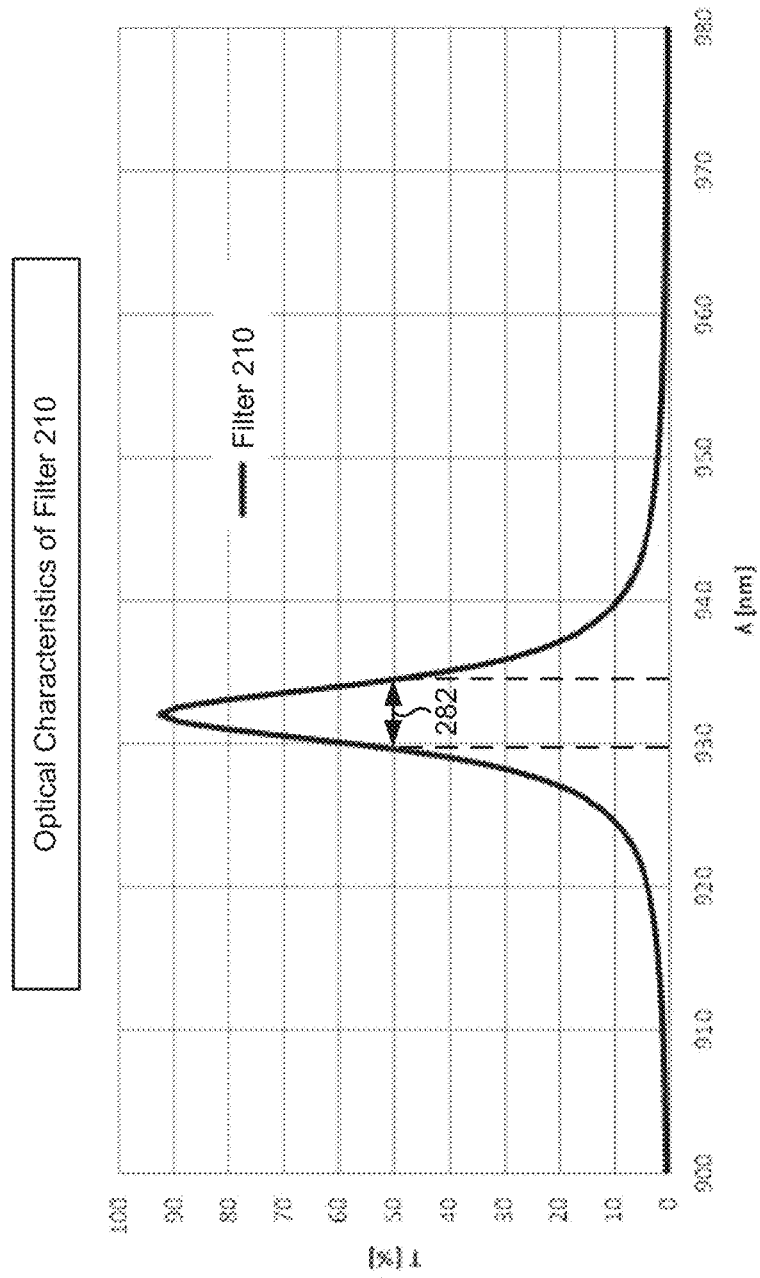

As shown in FIG. 2C, and by chart 270; and in FIG. 2D, and by chart 280, a filter response for filter 210 is provided. For example, filter 210 is associated with a transmissivity (shown as "T [%]") of greater than approximately 90% at a wavelength (shown as "λ [nm]") of approximately 932 nm. As shown in FIG. 2D, and by reference number 282, filter 210 is associated with a relative 50% bandwidth (e.g., a bandwidth for transmissivity greater than 50% surrounding a center wavelength representing a peak transmissivity) of approximately 5.3 nm in a spectral range from approximately 929.35 nm to approximately 934.65 nm.

As indicated above, FIGS. 2A-2D are provided merely as examples. Other examples are possible and may differ from what was described with regard to FIGS. 2A-2D.

FIGS. 3A-3D are diagrams of characteristics relating to a multispectral filter. FIGS. 3A-3D show an example of a multispectral filter with a first set of three quarterwave stacks and a second set of three quarterwave stacks sandwiching a spacer.

Figure 3A:
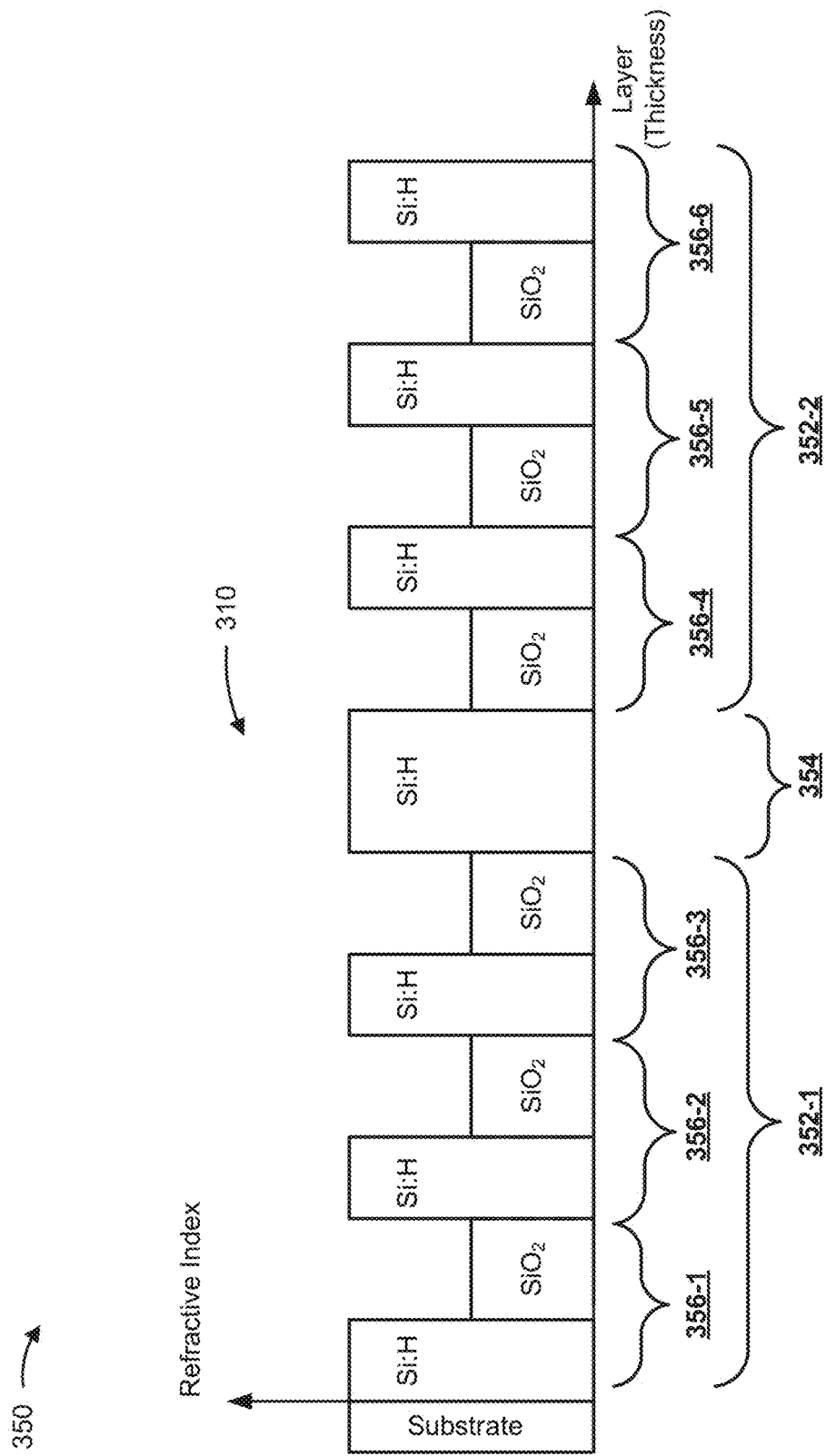
FIGS. 3A-3D are diagrams of characteristics relating to a multispectral filter described herein.

As shown in FIG. 3A, chart 350 represents a refractive index profile of a filter 310. As shown, filter 310 includes a substrate, a first mirror 352-1 deposited on the substrate, a second mirror 352-2, and a hydrogenated silicon spacer 354 disposed between first mirror 352-1 and second mirror 352-2. First mirror 352-1 includes a set of three quarterwave stacks 356-1 through 356-3. Second mirror 352-2 includes a set of three quarterwave stacks 356-4 through 356-6. Each quarterwave stack 356 includes a hydrogenated silicon layer and a silicon dioxide layer forming an HL pair.

Figure 3B:
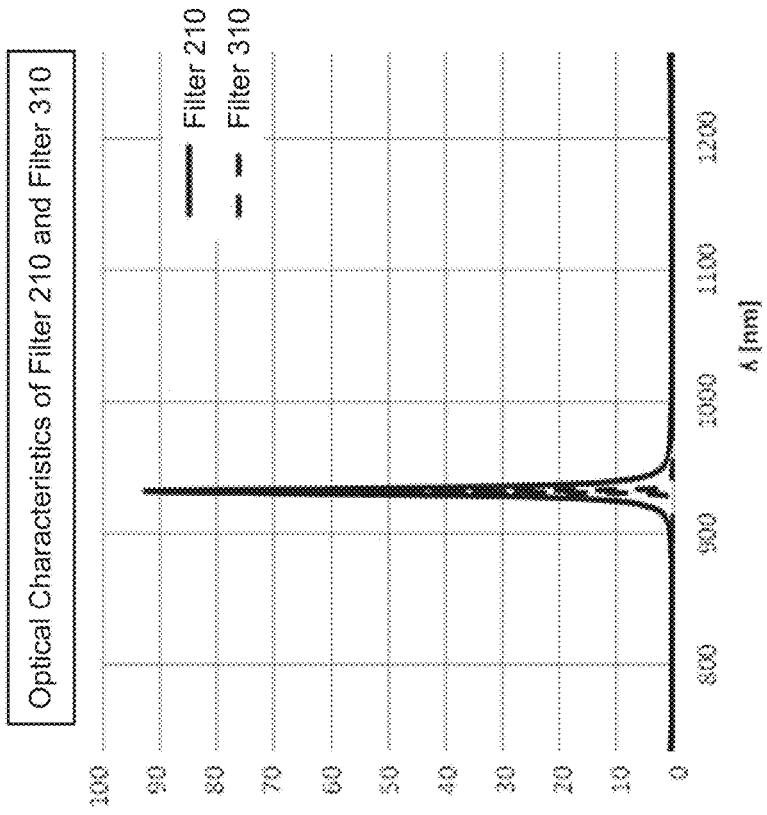
Figure 3C:
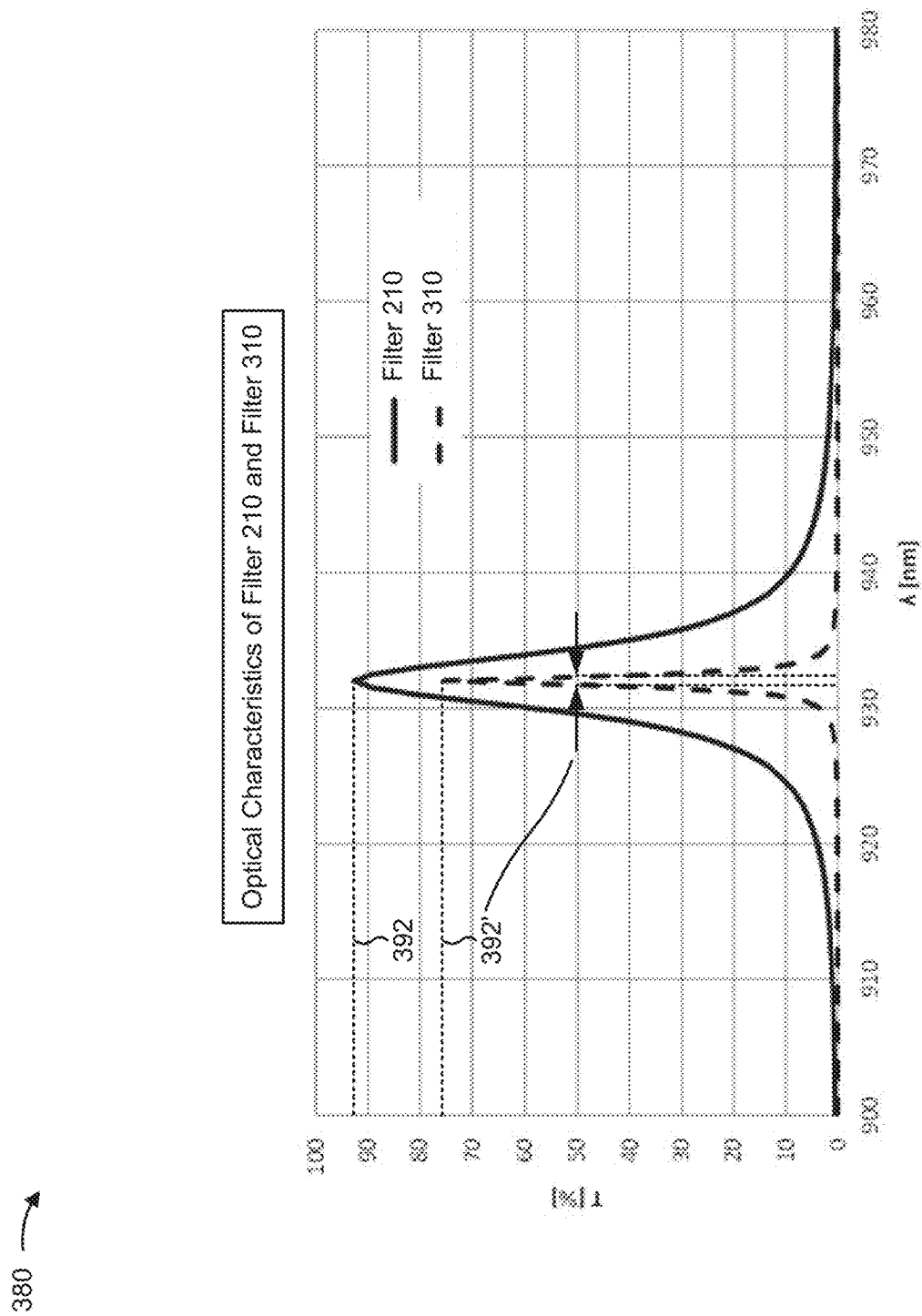
Figure 3D:
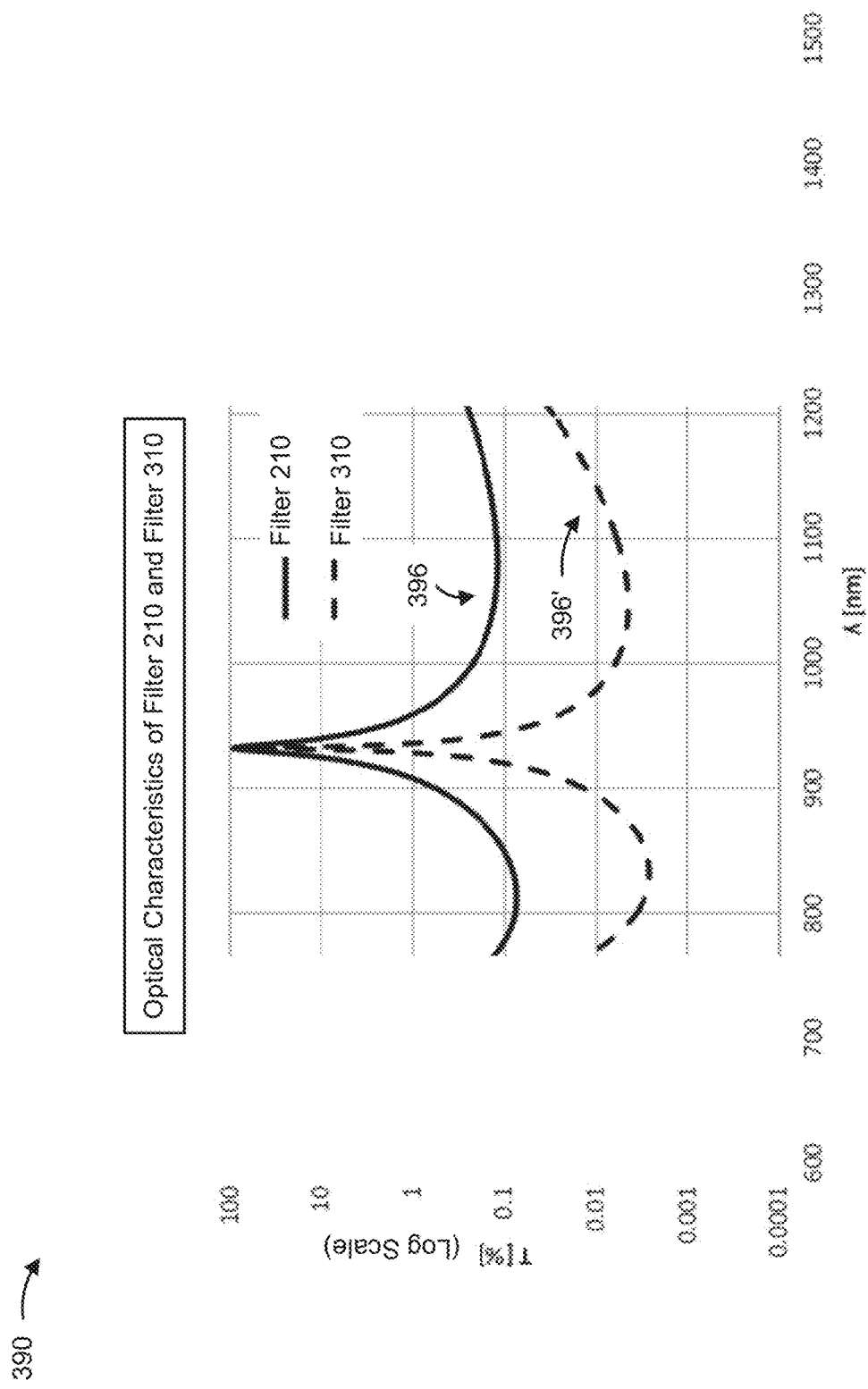

As shown in FIG. 3B, and by chart 370; in FIG. 3C, and by chart 380; and in FIG. 3D, and by chart 390, the filter response for filter 210 and a filter response for filter 310 are provided. For example, as shown in FIG. 3C, and by reference number 392 and 392', based on filter 310 including an additional hydrogenated silicon and silicon dioxide quarterwave stack for each mirror of filter 310 relative to filter 210, filter 310 is associated with a reduced peak transmissivity and a reduced relative 50% bandwidth. In this case, as shown in FIG. 3C and by reference number 392, filter 210 is associated with a transmissivity of approximately 92% at approximately 932 nm and a 50% relative bandwidth of 5.3 nm. In contrast, as shown in FIG. 3C, and by reference number 392', filter 310 is associated with a peak transmissivity of approximately 76% at approximately 932 nm, and is associated with a 50% relative bandwidth of approximately 0.9 nm. As shown in FIG. 3D, and by reference numbers 396 and 396', filter 310 is associated with a reduced out of band transmission relative to filter 210, and a minimum transmissivity is reduced from approximately 0.1% to approximately 0.005% for filter 310 relative to filter 210. In some implementations, transmissivity for filter 310 may be further improved by matching a configuration of filter 310 to a substrate and another medium (e.g., air).

In these cases, changing a quantity of quarterwave stacks in mirrors of a multispectral filter (e.g., from two quarterwave stacks in each mirror to three quarterwave stacks in each mirror) causes a change to optical characteristics of the multispectral filter, thereby enabling tuning the multispectral filter for a particular spectral range, a particular transmissivity, or the like. However, the change in optical characteristics may be greater than a threshold change. For example, a multispectral filter may be desired that is associated with a 50% relative bandwidth that is between approximately 0.9 nm and approximately 5.3 nm.

As indicated above, FIGS. 3A-3D are provided merely as examples. Other examples are possible and may differ from what was described with regard to FIGS. 3A-3D.

Figure 4A:
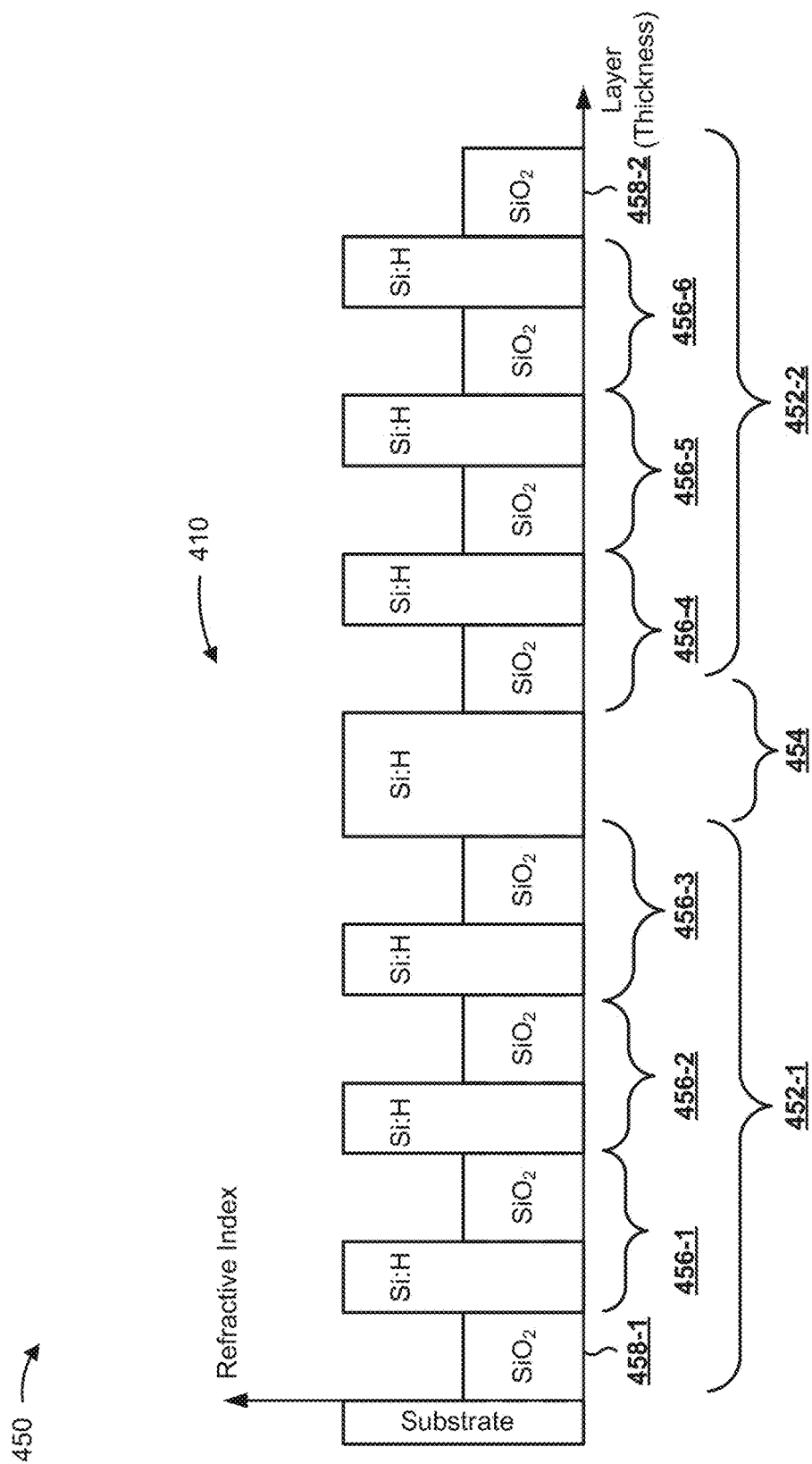
FIGS. 4A-4C are diagrams of characteristics relating to a multispectral filter described herein.
Figure 4B:
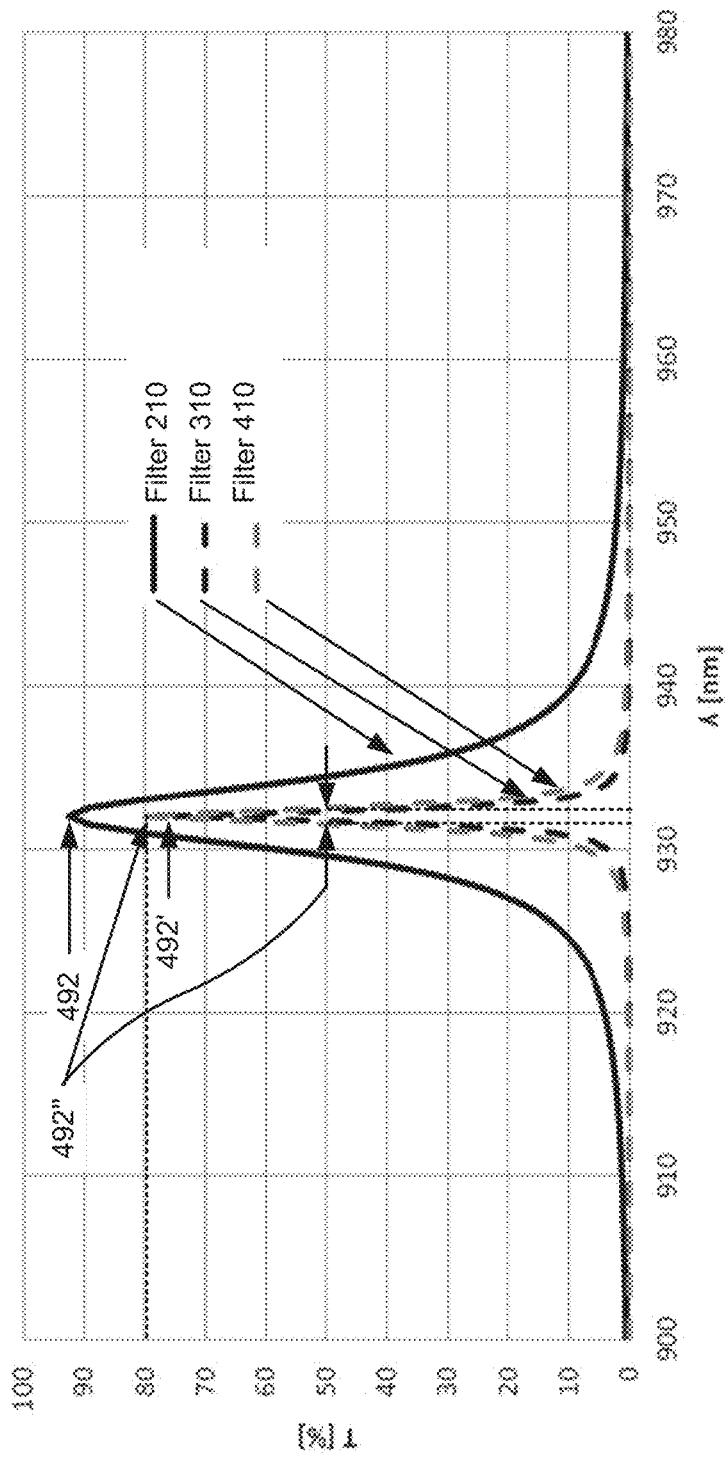
Figure 4C:
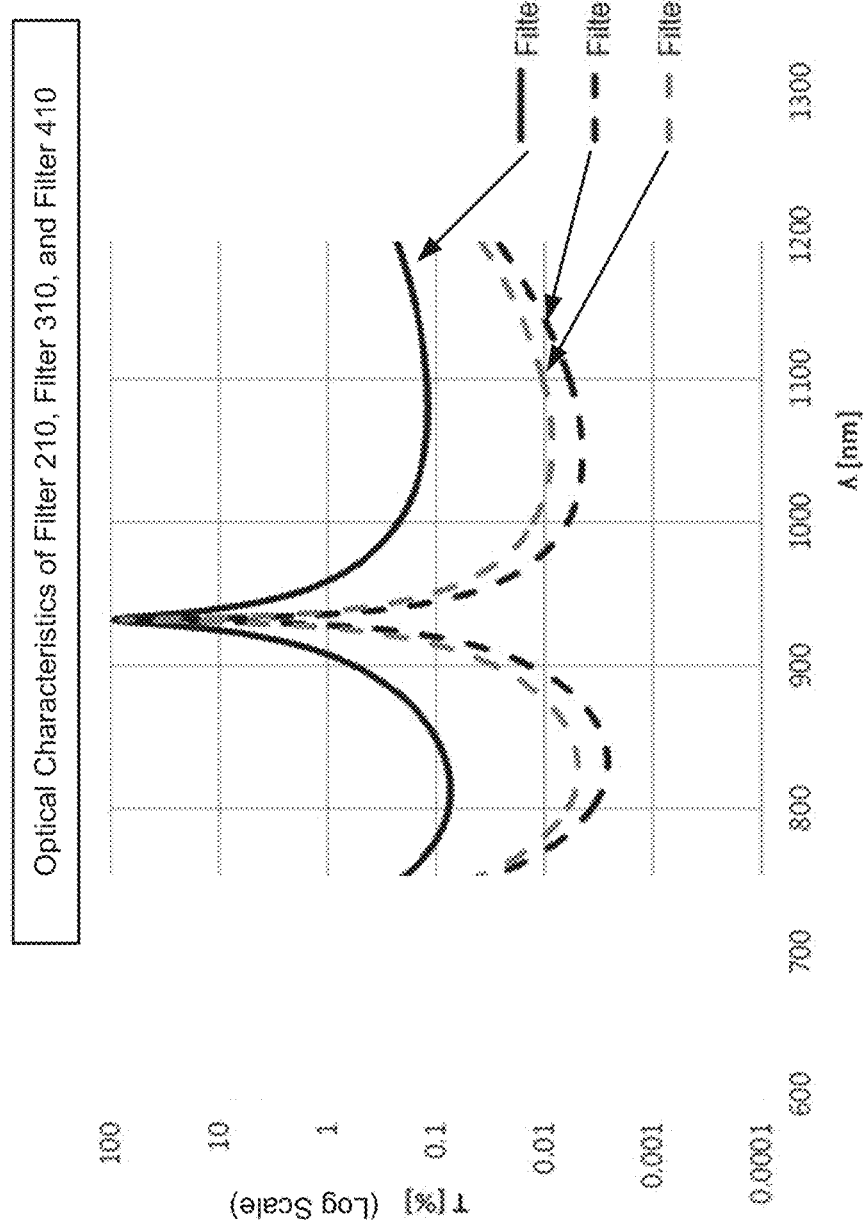

FIGS. 4A-4C are diagrams of characteristics relating to a multispectral filter. FIGS. 4A-4C show an example of a multispectral filter with an additional low index layer (e.g., a silicon dioxide layer) disposed contiguous to each of a first set of three quarterwave stacks and a second set of three quarterwave stacks, and a spacer disposed between the first set of three quarter wave stacks, the second set of three quarterwave stacks, and the additional low index layers.

As shown in FIG. 4A, chart 450 represents a refractive index profile of a filter 410. As shown, filter 410 includes a substrate, a first mirror 452-1 deposited on the substrate, a second mirror 452-2, and a spacer 454 disposed between first mirror 452-1 and second mirror 452-2. First mirror 452-1 includes a set of quarterwave stacks 456-1 through 456-3 and an unpaired silicon dioxide layer 458-1 (e.g., a low index silicon dioxide layer not paired with a high index hydrogenated silicon layer or another high index layer). Similarly, second mirror 452-2 includes a set of quarterwave stacks 456-4 through 456-6 and an unpaired silicon dioxide layer 458-2. Each quarterwave stack 456 is disposed between unpaired silicon dioxide layers 458-1 and 458-2, and includes a hydrogenated silicon layer and a silicon dioxide layer forming an HL pair. Although silicon dioxide layers 458 are not paired with corresponding high index layers (e.g., hydrogenated silicon layers), each silicon dioxide layer 458 may be termed a quarterwave stack for a respective mirror 452. In some implementations, filter 410 may be an array of optical filters aligned to a set of sensor elements of a sensor element array.

As shown in FIG. 4B, and by chart 470; and in FIG. 4C, and by chart 480, a set of filter responses for filter 210, filter 310, and filter 410 is provided. For example, as shown in FIG. 4B, and by reference number 492, 492', and 492", based on filter 410 including a set of unpaired silicon dioxide layers for each mirror of filter 410, filter 410 is associated with a peak transmissivity at approximately 932 nm that is between that of filter 210 and filter 310, and a 50% relative bandwidth that is between that of filter 210 and filter 310. In this case, as shown in FIG. 4B and by reference number 492, filter 210 is associated with a peak transmissivity of greater than 90% at approximately 932 nm and is associated with a 50% relative bandwidth of approximately 5.3 nm. As shown in FIG. 4B and by reference number 492', filter 310 is associated with a peak transmissivity of approximately 75% at approximately 932 nm and a 50% relative bandwidth of approximately 0.9 nm. In contrast, as shown in FIG. 4B, and by reference number 492", filter 410 is associated with a peak transmissivity of approximately 80% at approximately 932 nm and a 50% relative bandwidth of approximately 1.4 nm.

In this case, adding the unpaired set of silicon dioxide layers causes a change to optical characteristics of a multispectral filter, thereby enabling tuning the multispectral filter for a particular spectral range, a particular transmissivity, a particular bandwidth, or the like with a greater granularity than altering a quantity of quarterwave stacks.

As indicated above, FIGS. 4A-4C are provided merely as examples. Other examples are possible and may differ from what was described with regard to FIGS. 4A-4C.

Figure 5A:
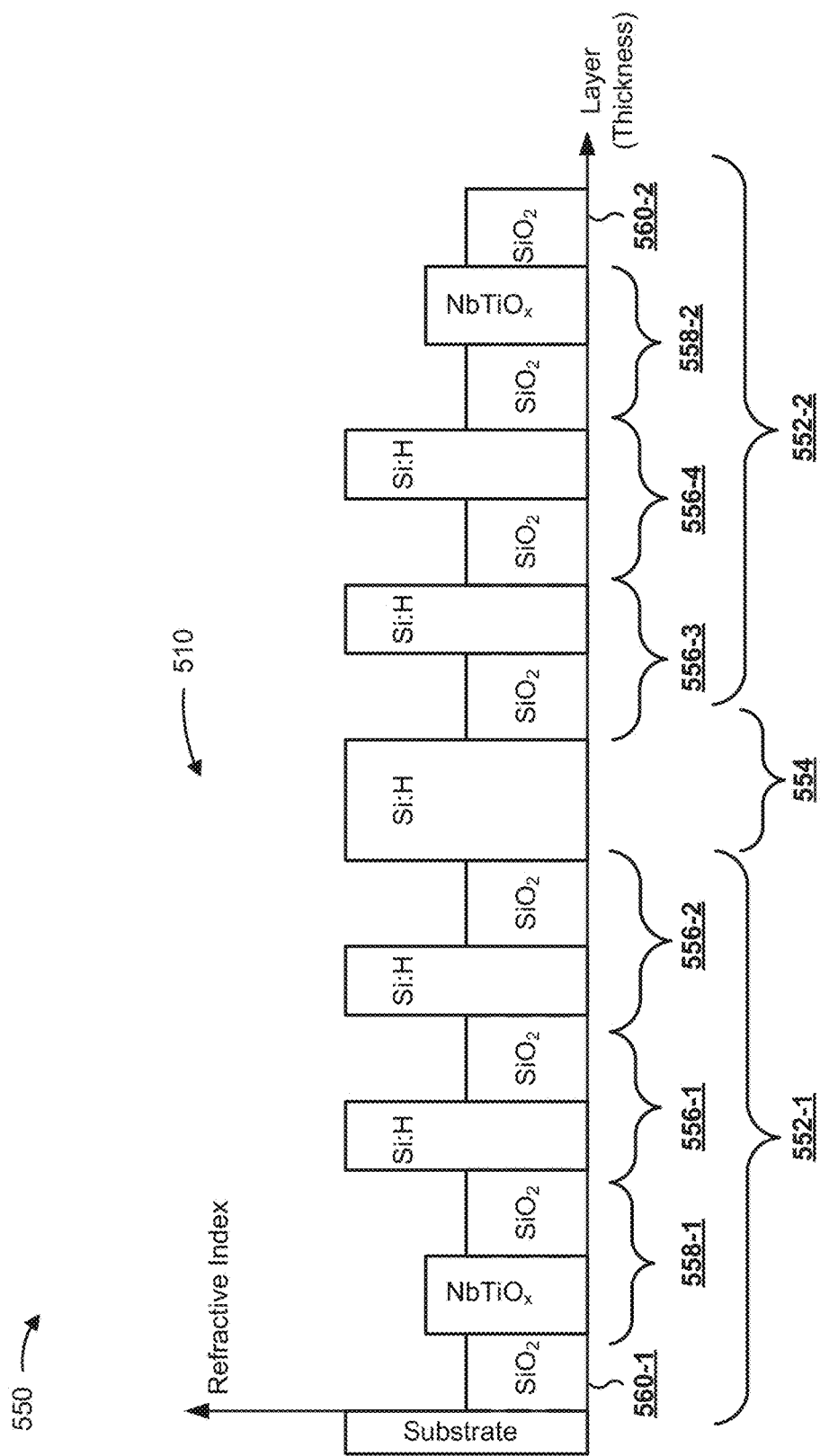
FIGS. 5A-5C are diagrams of characteristics relating to a multispectral filter described herein.
Figure 5B:
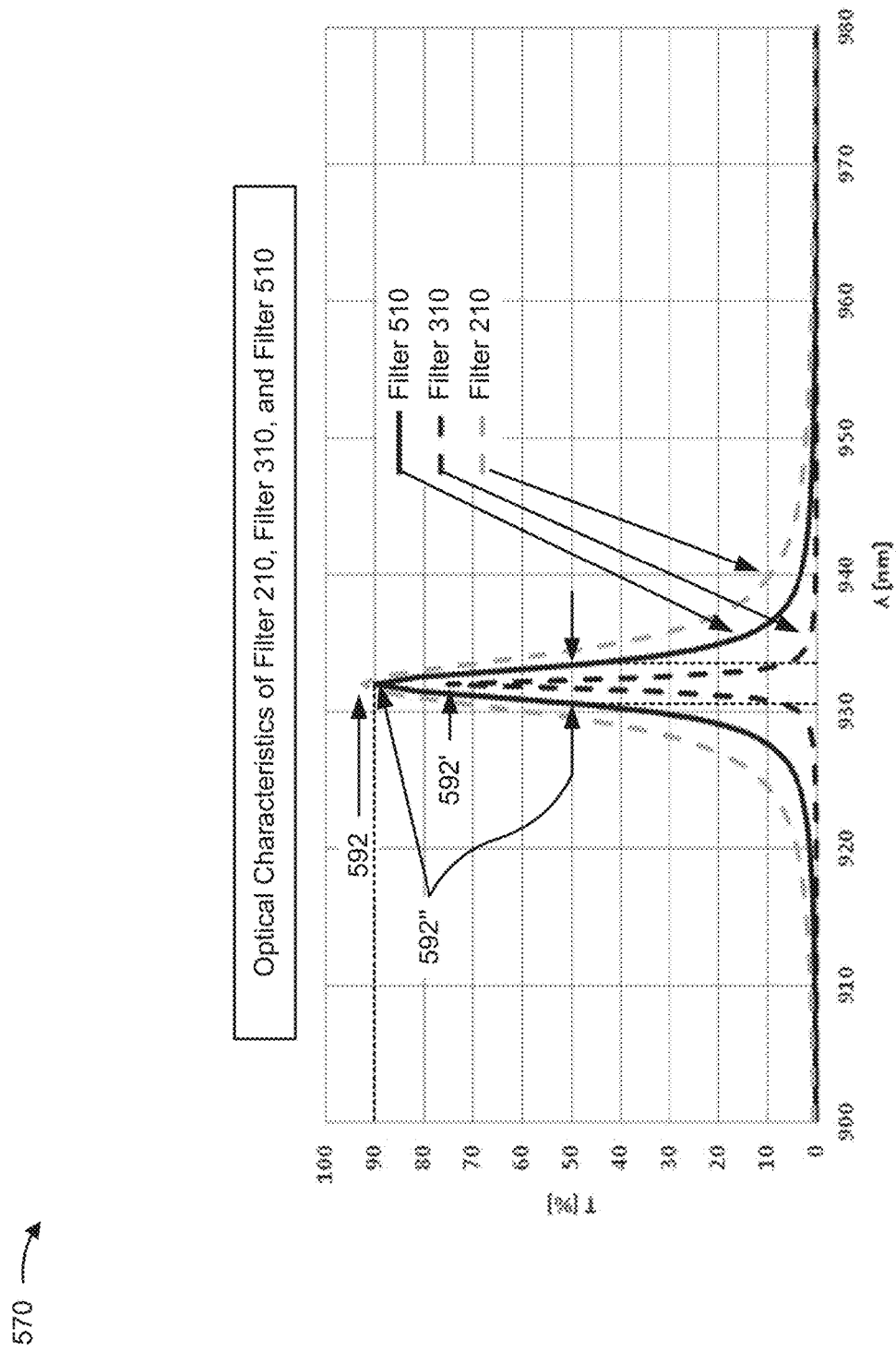
Figure 5C:
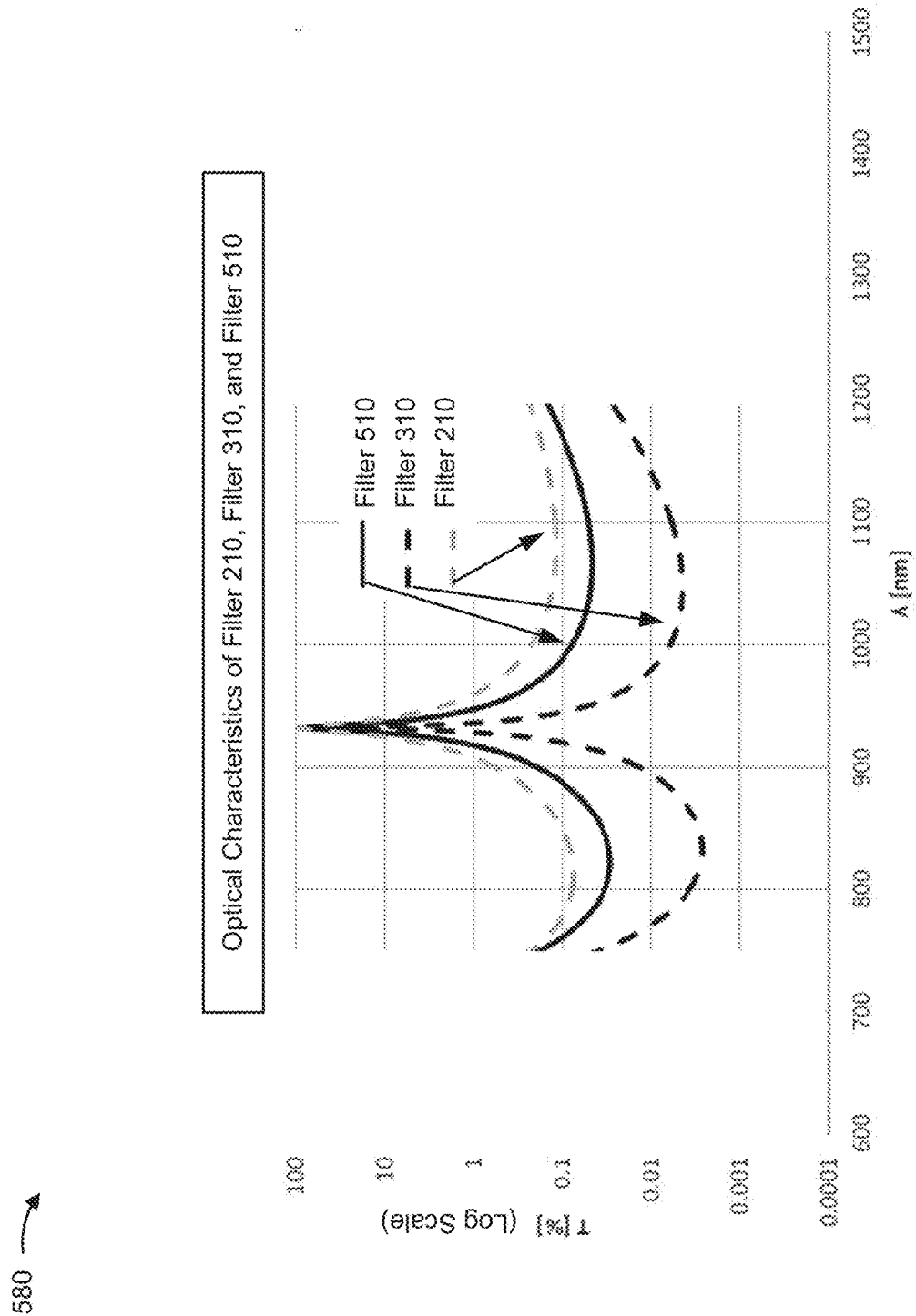

FIGS. 5A-5C are diagrams of characteristics relating to a multispectral filter. FIGS. 5A-5C show an example of a multispectral filter with mixed sets of quarterwave stacks, and a spacer disposed between the mixed sets of quarterwave stacks.

As shown in FIG. 5A, chart 550 represents a refractive index profile of a filter 510. As shown, filter 510 includes a substrate, a first mirror 552-1 deposited on the substrate, a second mirror 552-2, and a spacer 554 disposed between first mirror 552-1 and second mirror 552-2. First mirror 552-1 includes a set of quarterwave stacks 556-1 and 556-2, a quarterwave stack 558-1, and an unpaired silicon dioxide layer 560-1. Similarly, second mirror 552-2 includes a set of quarterwave stacks 556-3 and 556-4, a quarterwave stack 558-2, and an unpaired silicon dioxide layer 560-2. Each quarterwave stack 556 includes hydrogenated silicon and silicon dioxide forming an HL pair. Each quarterwave stack 558 includes niobium titanium oxide (NbTiO$_x$) forming an HL pair. In this case, filter 510 utilizes mixed sets of quarterwave stacks, with each mirror 552 including different types of HL pairs. Utilization of the mixed sets of quarterwave stacks permits characteristics of filter 510 to be controlled with a greater granularity than another technique that utilizes increased or decreased quantities of quarterwave stacks to control characteristics. Although described herein in terms of niobium titanium oxide, silicon dioxide, and hydrogenated silicon for quarterwave stacks of filter 510, another group of three or more materials may be used for a set of mixed quarterwave stacks, such as utilizing as an oxide material, such as silicon dioxide (SiO$_2$), niobium pentoxide (Nb$_2$O$_5$), tantalum pentoxide (Ta$_2$O$_5$), titanium dioxide (TiO$_2$), aluminum oxide (Al$_2$O$_3$), zirconium oxide (ZrO$_2$), yttrium oxide (Y$_2$O$_3$), hafnium dioxide (HfO$_2$), or the like, a nitride material, such as silicon nitride (Si3N4); a fluoride material, such as magnesium fluoride (MgF); a sulfide material, such as zinc sulfide (ZnS); a selenide material, such as zinc selenide (ZnSe); a combination thereof; or the like.

As shown in FIG. 5B, and by chart 570; and in FIG. 5C, and by chart 580, the filter response for filter 210, the filter response for filter 310, and a filter response for filter 510 are provided. For example, as shown in FIG. 5B, and by reference numbers 592, 592', and 592", based on filter 510 including the set of unpaired silicon dioxide layers 560 and utilizing the mixed set of quarterwave stacks, filter 510 is associated with a peak transmissivity at approximately 932 nm and a 50% relative bandwidth that is between that of filter 210 and filter 310. In this case, as shown in FIG. 5B and by reference number 592, filter 210 is associated with a peak transmissivity of greater than 90% at approximately 932 nm and a 50% relative bandwidth of approximately 5.3 nm, and as shown in FIG. 5B and by reference number 592', filter 310 is associated with a peak transmissivity of approximately 75% at approximately 932 nm and a 50% relative bandwidth of approximately 0.9 nm. In contrast, as shown in FIG. 5B, and by reference number 592", filter 510 is associated with a peak transmissivity of approximately 90% at approximately 932 nm and a 50% relative bandwidth of approximately 3.1 nm.

In this case, utilizing the set of mixed quarterwave stacks causes a change to optical characteristics of the multispectral filter, thereby enabling tuning the multispectral filter for a particular spectral range, a particular transmissivity, or the like with a greater granularity than altering a quantity of quarterwave stacks.

As indicated above, FIGS. 5A-5C are provided merely as examples. Other examples are possible and may differ from what was described with regard to FIGS. 5A-5C.

Figure 6B:
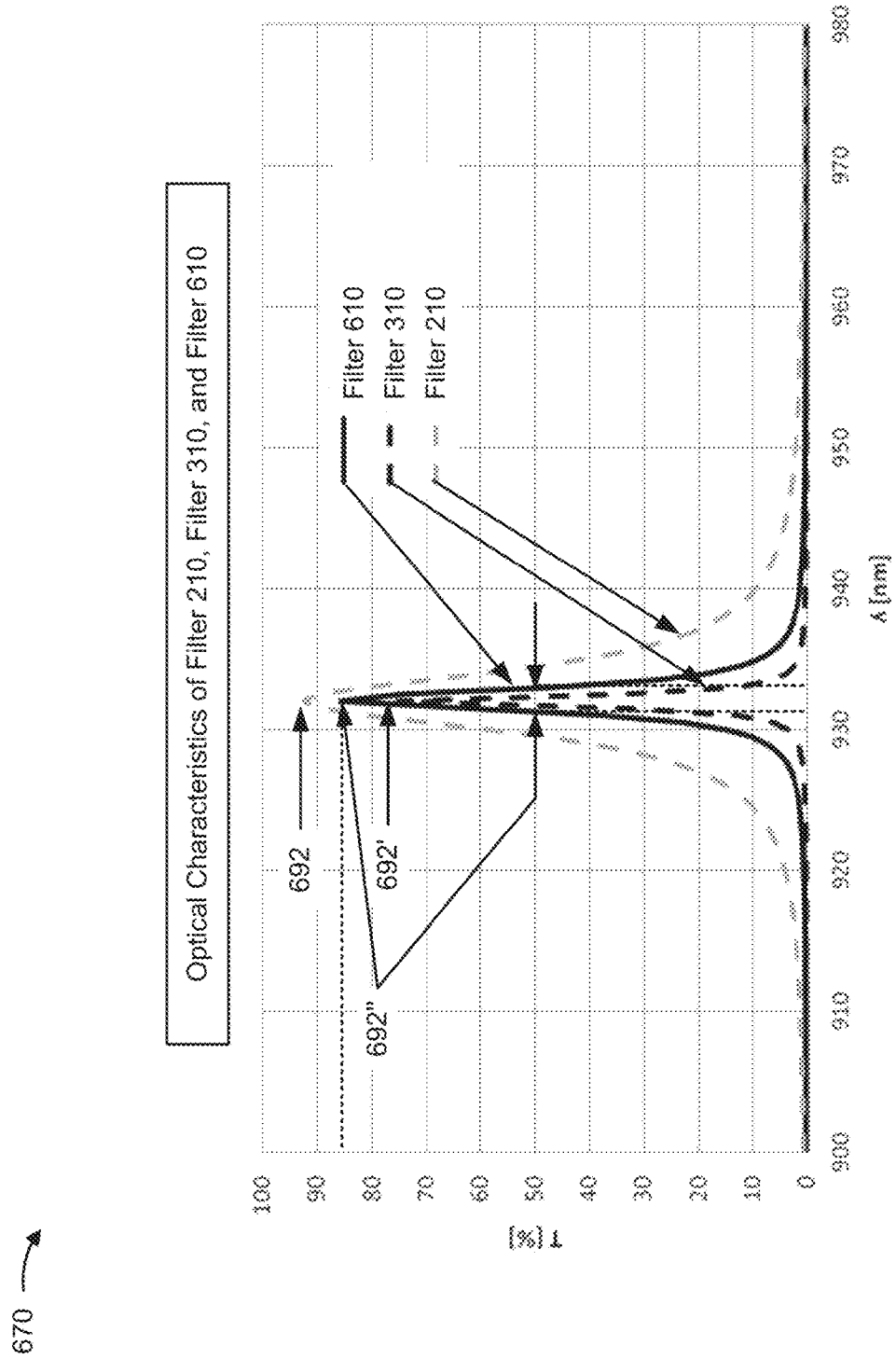
Figure 6C:
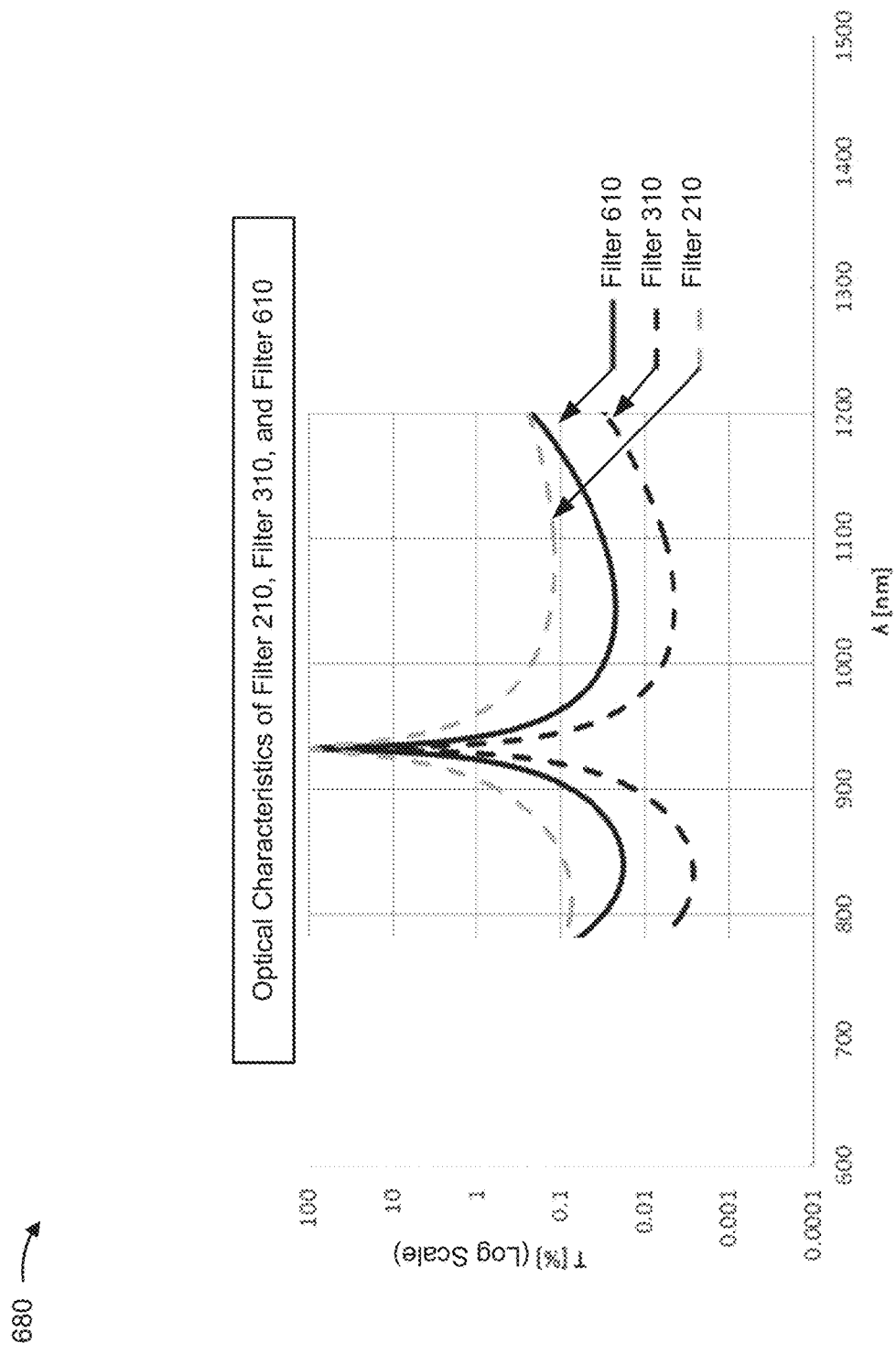

FIGS. 6A-6C are diagrams of characteristics relating to a multispectral filter. FIGS. 6A-6C show an example of a multispectral filter with detuned sets of quarterwave stacks, and a spacer disposed between the detuned sets of quarterwave stacks.

As shown in FIG. 6A, chart 650 represents a comparison of a refractive index profile of filter 410 and a refractive index profile of a filter 610. As shown, filter 610 includes a substrate, a first mirror 652-1 deposited on the substrate, a second mirror 652-2, and a hydrogenated silicon spacer 654 disposed between first mirror 652-1 and second mirror 652-2. First mirror 652-1 includes a set of quarterwave stacks 656-1 through 656-3 and an unpaired silicon dioxide layer 658-1. Similarly, second mirror 652-2 includes a set of quarterwave stacks 656-4 through 656-6 and an unpaired silicon dioxide layer 658-2. Each quarterwave stack 656 includes a hydrogenated silicon layer and a silicon dioxide layer forming an HL pair. In some implementations, another set of materials may be used for quarterwave stacks 656. In some implementations, quarterwave stacks 656 may be a mixed set of quarterwave stacks using three or more materials.

As further shown in FIG. 6A, and by reference number 660, filter 610 (e.g., of mirrors 652) includes silicon dioxide layers that are associated with a threshold reduction in thickness relative to silicon dioxide layers of filter 410 (e.g., of mirrors 452). As shown by reference number 662, filter 610 includes hydrogenated silicon layers associated with a threshold increase in thickness relative to hydrogenated silicon layers of filter 410. In some implementations, the threshold increase or reduction may be a selected to detune the quarterwave stacks from a quarterwave thickness (e.g., a thickness associated with a center wavelength of light that is to be incident on the quarterwave stacks), thereby centering filter 610 at a selected center wavelength for a peak transmissivity and/or altering a 50% relative bandwidth for filter 610, such as by utilizing an approximately 30% increase or an approximately 30% reduction in thickness. Additionally, or alternatively, an increase or reduction in thickness between approximately 25% and 30%, between approximately 20% and 40%, between approximately 10% and 50%, or the like may be selected for filter 610.

As shown in FIG. 6B, and by chart 670; and in FIG. 6C, and by chart 680, a set of filter responses for filter 210, filter 310, and filter 610 is provided. For example, as shown in FIG. 6B, and by reference numbers 692, 692', and 692", based on filter 610 including a set of detuned quarterwave stacks (e.g., quarterwave stacks using altered layer thicknesses), filter 610 is associated with a peak transmissivity at approximately 932 nm and a 50% relative bandwidth that is between that of filter 210 and filter 310. In this case, as shown in FIG. 6B and by reference number 692, filter 210 is associated with a peak transmissivity of greater than 90% at approximately 932 nm and a 50% relative bandwidth of approximately 5.3, and as shown in FIG. 6B and by reference number 592', filter 310 is associated with a peak transmissivity of approximately 75% at approximately 932 nm and a 50% relative bandwidth of approximately 0.9 nm. In contrast, as shown in FIG. 6B, and by reference number 692", filter 610 is associated with a peak transmissivity of approximately 87% at approximately 932 nm and a 50% relative bandwidth of approximately 2.0 nm.

In this case, utilizing the set of detuned quarterwave stacks causes a change to optical characteristics of the multispectral filter, thereby enabling tuning the multispectral filter for a particular spectral range, a particular transmissivity, or the like with a greater granularity than altering a quantity of quarterwave stacks. For example, detuning a thickness of quarterwave stacks permits configuration of an optical filter with a selected bandwidth, such as a bandwidth between bandwidths associated with different quantities of quarterwave stacks, a bandwidth overlapping with bandwidths associated with different quantities of quarterwave stacks, or the like.

As indicated above, FIGS. 6A-6C are provided merely as examples. Other examples are possible and may differ from what was described with regard to FIGS. 6A-6C.

FIGS. 7A-7D are diagrams of characteristics relating to a set of multispectral filters. FIGS. 7A-7D show examples of multispectral filters with mixed sets of quarterwave stacks.

Figure 7A:
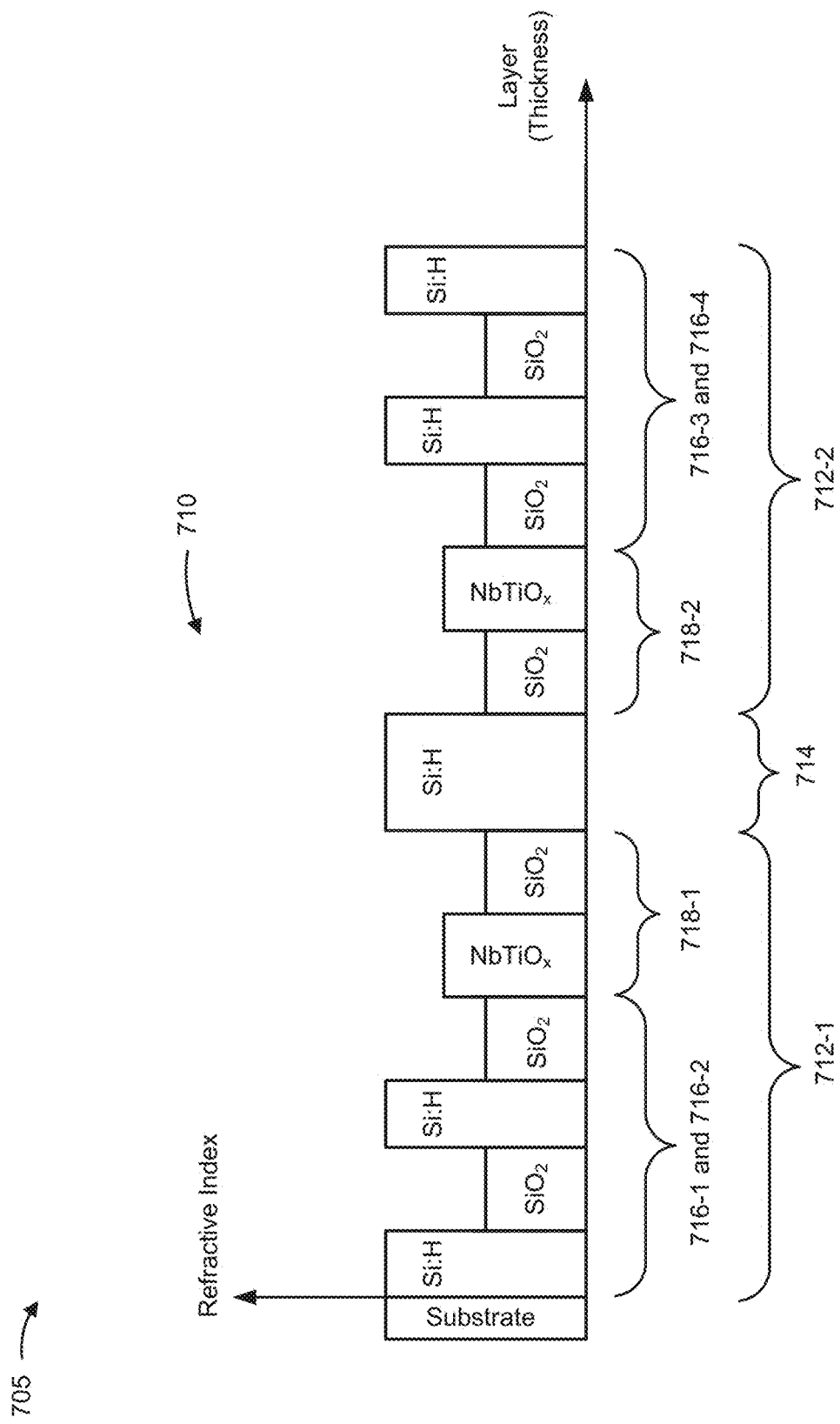
FIGS. 7A-7D are diagrams of characteristics relating to a multispectral filter described herein.

As shown in FIG. 7A, chart 705 represents a refractive index profile of filter 710. As shown, filter 710 includes a substrate, a first mirror 712-1 deposited on the substrate, a second mirror 712-2, and a hydrogenated silicon spacer 714 disposed between first mirror 712-1 and second mirror 712-2. First mirror 712-1 includes a set of quarterwave stacks 716-1 and 716-2 of hydrogenated silicon and silicon dioxide as HL pairs and a quarterwave stack 718-1 of niobium titanium oxide and silicon dioxide as an HL pair. Second mirror 712-2 includes a set of quarterwave stacks 716-3 and 716-4 of hydrogenated silicon and silicon dioxide as HL pairs and a quarterwave stack 718-2 of niobium titanium oxide and silicon dioxide as an HL pair. In this case, quarterwave stack 718-1 is disposed between quarterwave stack 716-2 and hydrogenated silicon spacer 714, and quarterwave stack 718-2 is disposed between quarterwave stack 716-3 and hydrogenated silicon spacer 714.

Figure 7B:
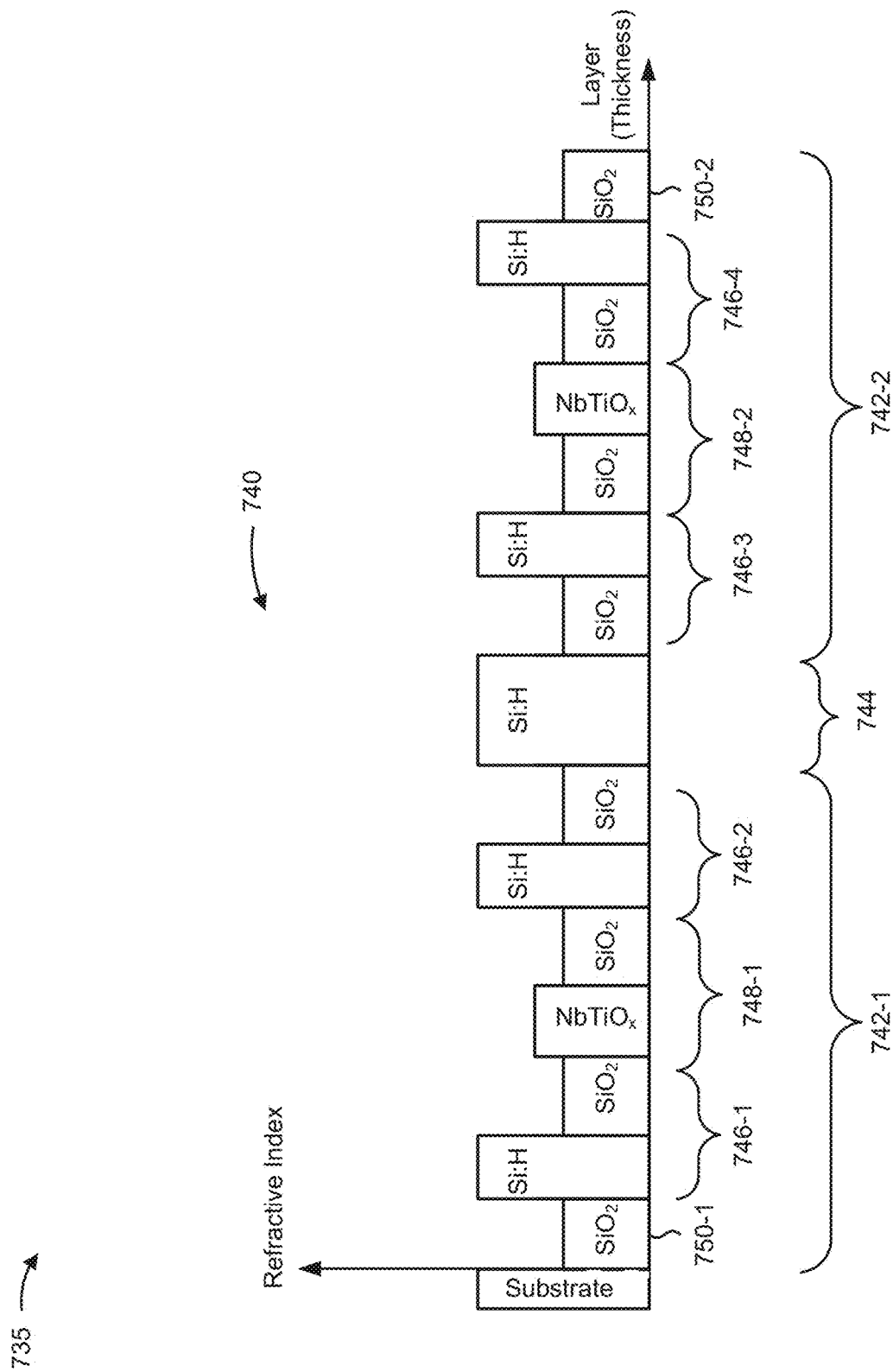

As shown in FIG. 7B, chart 735 represents a refractive index profile of filter 740. As shown, filter 740 includes a substrate, a first mirror 742-1 deposited onto the substrate, a second mirror 742-2, and a hydrogenated silicon spacer 744 disposed between first mirror 742-1 and second mirror 742-2. First mirror 742-1 includes a set of quarterwave stacks 746-1 and 746-2 of hydrogenated silicon and silicon dioxide as HL pairs, a quarterwave stack 748-1 of niobium titanium oxide and silicon dioxide as an HL pair, and an unpaired silicon dioxide layer 750-1. Similarly, second mirror 742-2 includes a set of quarterwave stacks 746-3 and 746-4 of hydrogenated silicon and silicon dioxide as HL pairs, a quarterwave stack 748-2 of niobium titanium oxide and silicon dioxide as an HL pair, and an unpaired silicon dioxide layer 750-2. In this case, quarterwave stack 748-1 is disposed between quarterwave stacks 746-1 and 746-2, and quarterwave stack 748-2 is disposed between quarterwave stacks 746-3 and 746-4.

Figure 7C:
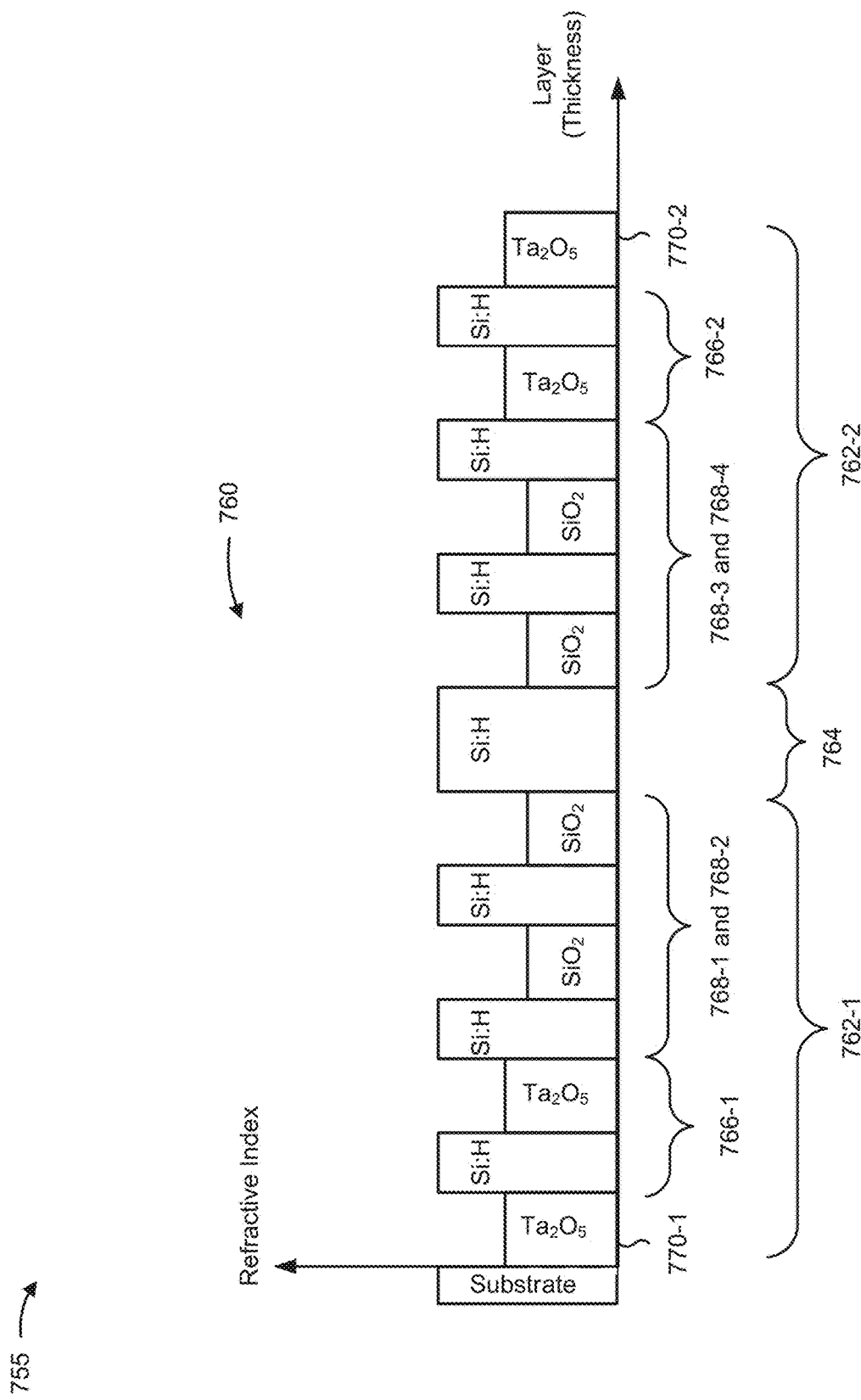

As shown in FIG. 7C, chart 755 represents a refractive index profile of filter 760. As shown, filter 760 includes a substrate, a first mirror 762-1 deposited on the substrate, a second mirror 762-2, and a hydrogenated silicon spacer 764 disposed between first mirror 762-1 and second mirror 762-2. First mirror 762-1 includes a quarterwave stack 766-1 of hydrogenated silicon and tantalum pentoxide ($Ta_2O_5$) as an HL pair, a set of two quarterwave stacks 768-1 and 768-2 of hydrogenated silicon and silicon dioxide as HL pairs, and an unpaired tantalum pentoxide layer 770-1. Similarly, second mirror 762-2 includes a quarterwave stack 766-2 of hydrogenated silicon and tantalum pentoxide as an HL pair, a set of two quarterwave stacks 768-3 and 768-4 of hydrogenated silicon and silicon dioxide as HL pairs, and an unpaired tantalum pentoxide layer 770-2. In this case, quarterwave stacks 768-1 and 768-2 are disposed between quarterwave stack 766-1 and hydrogenated silicon spacer 764, and quarterwave stacks 768-3 and 768-4 are disposed between quarterwave stack 766-2 and hydrogenated silicon spacer 764.

Figure 7D:
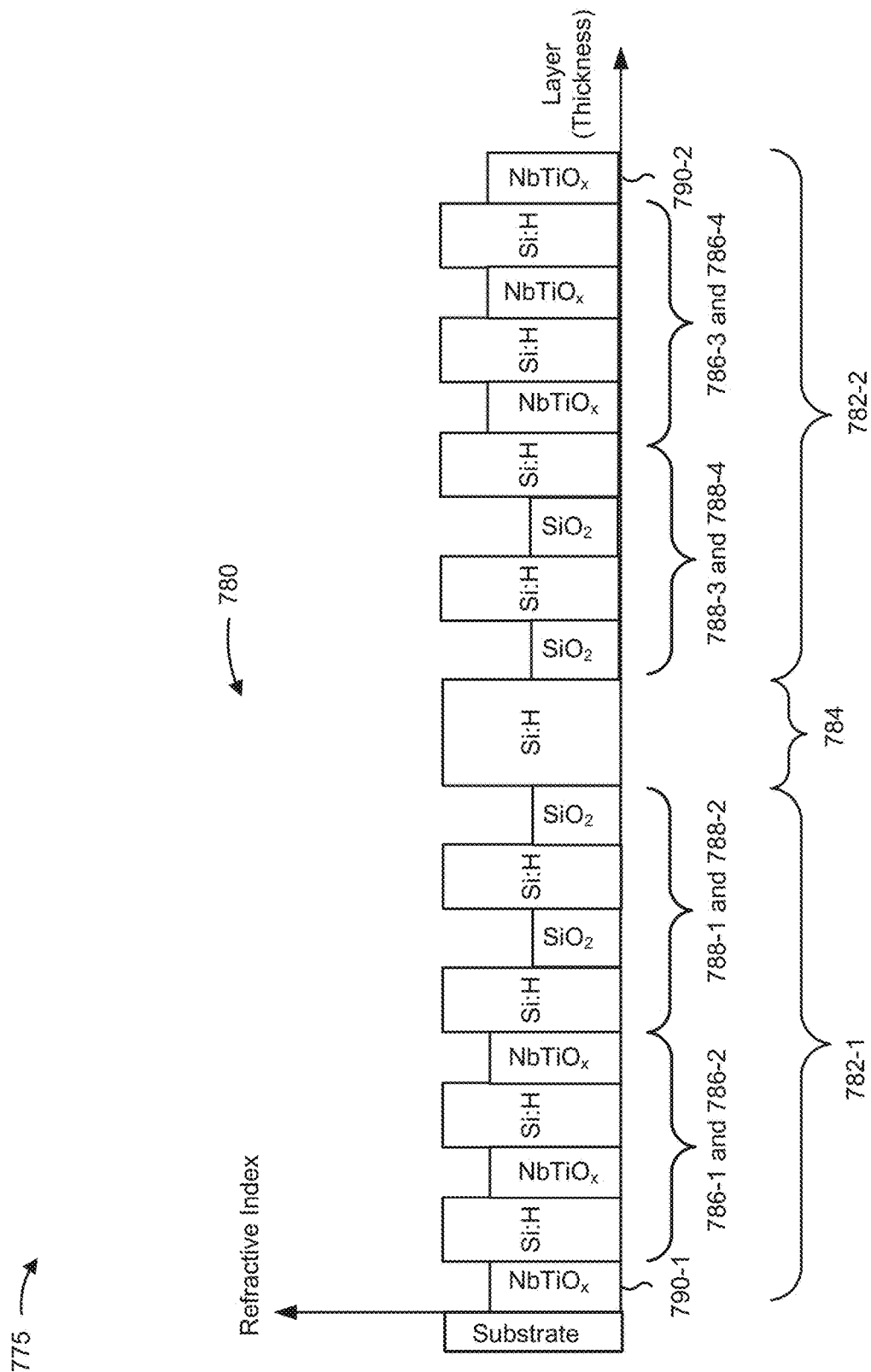

As shown in FIG. 7D, chart 775 represents a refractive index profile of filter 780. As shown, filter 780 includes a substrate, a first mirror 782-1 deposited on the substrate, a second mirror 782-2, and a hydrogenated silicon spacer 784 disposed between first mirror 782-1 and second mirror 782-2. First mirror 782-1 includes a set of two quarterwave stacks 786-1 and 786-2 of hydrogenated silicon and niobium titanium oxide as HL pairs, a set of two quarterwave stacks 788-1 and 788-2 of hydrogenated silicon and silicon dioxide as HL pairs, and an unpaired niobium titanium oxide layer 790-1. Similarly, second mirror 782-2 includes a set of two quarterwave stacks 786-3 and 786-4 of hydrogenated silicon and niobium titanium oxide as HL pairs, a set of two quarterwave stacks 788-3 and 788-4 of hydrogenated silicon and silicon dioxide as HL pairs, and an unpaired tantalum pentoxide layer 790-2. In this case, quarterwave stacks 788-1 and 788-2 are disposed between quarterwave stack 786-2 and hydrogenated silicon spacer 784, and quarterwave stacks 788-3 and 788-4 are disposed between quarterwave stack 786-3 and hydrogenated silicon spacer 784.

As indicated above, FIGS. 7A-7D are provided merely as examples. Other examples are possible and may differ from what was described with regard to FIGS. 7A-7D.

Figure 8B:
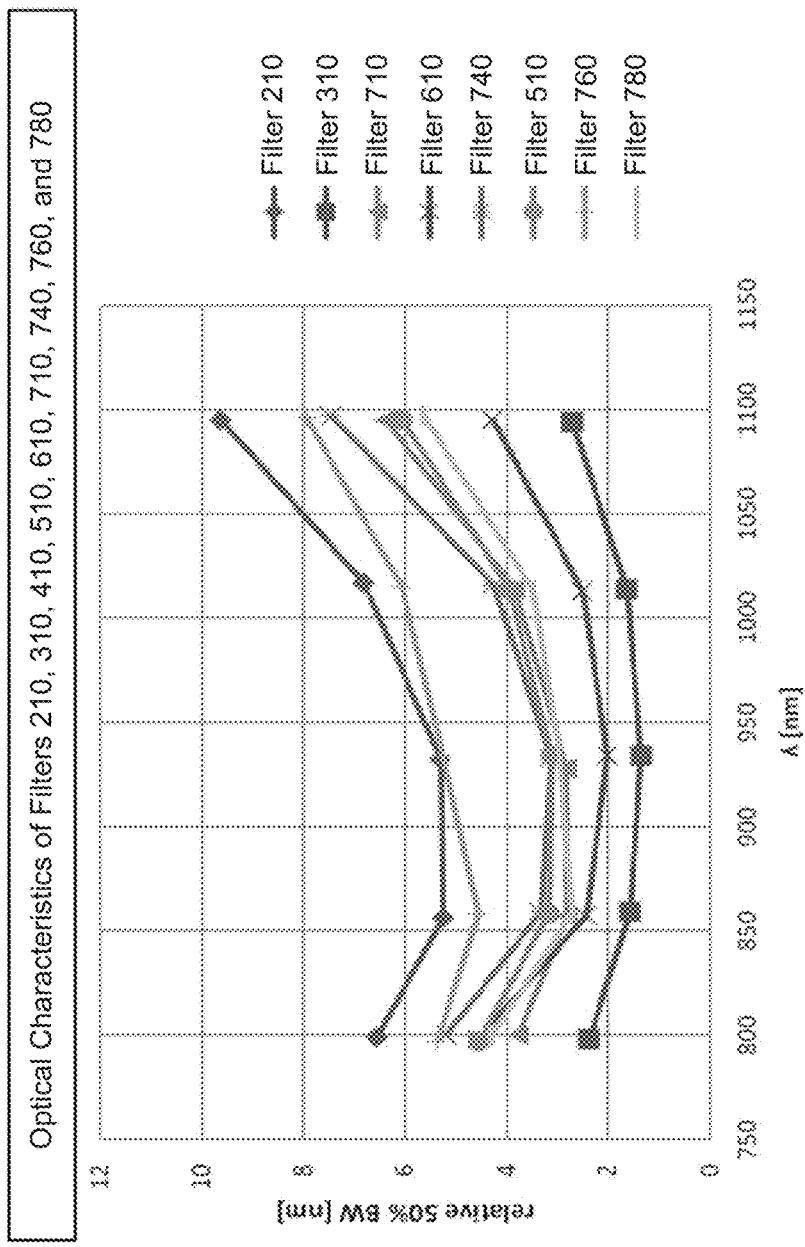

FIGS. 8A and 8B are diagrams of characteristics relating to a set of multispectral filters. FIGS. 8A and 8B show examples of 50% relative bandwidths for filters described herein.

As shown in FIG. 8A, and by table 800, a set of 50% relative bandwidths for filters described herein is provided for a center wavelength of approximately 932 nm. As shown, filter 210 is associated with a 50% relative bandwidth of approximately 5.3 nm. Adding an additional quarterwave stack to form filter 310 results in a 50% relative bandwidth of approximately 0.9 nm. As described herein, multiple techniques may be utilized to tune a multispectral filter with a greater degree of granularity (e.g., to tune a multispectral filter to a 50% relative bandwidth that is between approximately 0.9 nm and approximately 5.3 nm or another range of 50% relative bandwidths associated with another set of multispectral filters). For example, filter 410 results in a 50% relative bandwidth of approximately 1.4 nm, filter 510 results in a relative bandwidth of approximately 3.1 nm, filter 610 results in a 50% relative bandwidth of 2.0 nm, filter 710 results in a 50% relative bandwidth of approximately 2.8 nm, filter 740 results in a 50% relative bandwidth of approximately 3.1 nm, filter 760 results in a 50% relative bandwidth of approximately 5.3 nm, and filter 780 results in a 50% relative bandwidth of approximately 3.0 nm. In this way, a multispectral filter may utilize three or more different materials for quarterwave stack mirrors, detuned quarterwave stack thicknesses, unpaired quarterwave stack layers, or the like to achieve a particular spectral range, transmissivity, or the like.

As shown in FIG. 8B, and by chart 850, a set of 50% relative bandwidths for filters described herein is provided at a set of center wavelengths. For example, based on tuning a multispectral filter described herein to a particular center wavelength (e.g., by altering a spacer thickness for the multispectral filter), a 50% relative bandwidth may be determined. As shown, for a spectral range of center wavelengths of between approximately 800 nm and approximately 1100 nm, each of filters 410, 510, 610, 710, 740, 760, and 780 is associated with a 50% relative bandwidth between that of filters 210 and 310. For example, at a center wavelength of approximately 800 nm, filters 410, 510, 610, 710, 740, 760, and 780 are associated with a 50% relative bandwidth of between approximately 3.75 nm and approximately 5.75 nm. Similarly, at a center wavelength of approximately 1100 nm, filters 410, 510, 610, 710, 740, 760, and 780 are associated with a 50% relative bandwidth of between approximately 4 nm and approximately 8 nm.

As indicated above, FIGS. 8A and 8B are provided merely as examples. Other examples are possible and may differ from what was described with regard to FIGS. 8A and 8B.

Although some implementations, described herein, are described in terms of a granularity of tuning of spectral range relative to another optical filter with two quarterwave stacks or three quarterwave stacks, some implementations described herein may provide greater granularity of tuning relative to other quantities of quarterwave stacks. For example, utilizing a third coating material, fourth coating material, or the like or detuning a thickness of quarterwave stacks may permit improve granularity of tuning of an optical filter for a particular spectral range, transmissivity, or the like relative to an addition or subtraction of one quarterwave stack, an addition or subtraction of two quarterwave stacks, an addition or subtraction of three quarterwave stacks, an addition or subtraction of four quarterwave stacks, or the like.

In this way, utilization of a mixed set of quarterwave stacks or a detuned set of quarterwave stacks results in a greater granularity for controlling a transmissivity, bandwidth, or the like relative to another technique involving utilizing additional quantities of quarterwave stacks. Based on improving a granularity of control of multispectral filters, sensing is improved for sensor elements attached to the multispectral filters.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical filter, comprising:
a first mirror and a second mirror,
    each of the first mirror and the second mirror including
        a first one or more quarterwave stacks,
        a quarterwave stack, of the first one or more quarterwave stacks, including a set of alternating layers of a first material and a second material,
            the first material being associated with a higher refractive index than the second material,
    each of the first mirror and the second mirror including
        a second one or more quarterwave stacks,
        a quarterwave stack, of the second one or more quarterwave stacks, including one or more alternating layers of a third material and a fourth material,
            the third material being associated with a higher refractive index than the fourth material,
        the first material, the second material, the third material, and the fourth material comprising three or more different materials; and
a spacer disposed between the first mirror and the second mirror.

2. The optical filter of claim 1, where at least one of the three or more different materials is an oxide material,
the oxide material including at least one of:
    niobium titanium oxide ($NbTiO_x$),
    silicon dioxide ($SiO_2$),
    aluminum oxide ($Al_2O_3$),
    titanium dioxide ($TiO_2$),
    niobium pentoxide ($Nb_2O_5$),
    tantalum pentoxide ($Ta_2O_5$),
    zirconium oxide ($ZrO_2$), yttrium oxide ($Y_2O_3$),
hafnium dioxide ($HfO_2$), or
a combination thereof.

3. The optical filter of claim 1, where at least one of three or more different materials includes at least one of:
a nitride material,
a fluoride material,
a sulfide material,
a selenide material, or
a combination thereof.

4. The optical filter of claim 1, where at least one of the first mirror or the second mirror includes a hydrogenated silicon (Si:H) material.

5. The optical filter of claim 1, where the spacer is a hydrogenated silicon (Si:H) spacer.

6. The optical filter of claim 1, where at least one of the three or more different materials is associated with a refractive index, at a spectral range of between approximately 800 nm and approximately 1100 nm, greater than 2.0.

7. The optical filter of claim 1, where at least one of the three or more different materials is associated with a refractive index, at a spectral range of between approximately 800 nm and approximately 1100 nm, less than 3.0.

8. The optical filter of claim 1, where the optical filter is associated with a 50% relative bandwidth of between approximately 0.9 nm and approximately 5.3 nm at a center wavelength of 932 nm.

9. The optical filter of claim 1, where the optical filter is associated with a 50% relative bandwidth of between approximately 3.75 nm and approximately 5.75 nm at a center wavelength of 800 nm.

10. The optical filter of claim 1, where the optical filter is associated with a 50% relative bandwidth of between approximately 4 nm and approximately 8 nm at a center wavelength of 1100 nm.

11. The optical filter of claim 1, where the optical filter is deposited onto a substrate associated with a set of sensor elements of a sensor element array,
the spacer of the optical filter including a plurality of layers forming a plurality of channels corresponding to the set of sensor elements of the sensor element array.

12. The optical filter of claim 1, where the optical filter is in an array of optical filters corresponding to a set of sensor elements of a sensor element array.

13. A multispectral filter, comprising:
a first set of dielectric layers to reflect a portion of light directed toward the first set of dielectric layers,
the first set of dielectric layers including a first one or more quarterwave stacks,
the first set of dielectric layers comprising a first set of three or more different materials;
a set of spacer layers,
a layer, of the set of spacer layers, being selected based on a refractive index of the layer and corresponding to a wavelength of light that is to be directed toward a sensor element, of a set of sensor elements, corresponding to a channel of a set of channels formed by the set of spacer layers; and
a second set of dielectric layers to reflect a portion of light directed toward the second set of dielectric layers,
the second set of dielectric layers including a second one or more quarterwave stacks,
the second set of dielectric layers comprising a second set of three or more different materials.

14. The multispectral filter of claim 13, where the first set of three or more different materials and the second set of three or more different materials are a common set of three or more different materials.

15. The multispectral filter of claim 13, where the first one or more quarterwave stacks includes:
a first quarterwave stack,
the first quarterwave stack including a first material of the first set of three or more different materials, and a second material of the first set of three or more different materials; and
a second quarterwave stack,
the second quarterwave stack including the first material and a third material of the second set of three or more different materials.

16. The multispectral filter of claim 13, where a quantity of channels of the set of channels is greater than or equal to a channel quantity threshold:
the channel quantity threshold being one of:
8 channels,
16 channels,
32 channels,
64 channels, or
128 channels.

17. The multispectral filter of claim 13, where a thickness of at least one layer of the first set of dielectric layers and the second set of dielectric layers is detuned from a quarterwave thickness.

18. The multispectral filter of claim 17, where the thickness is detuned by a threshold percentage,
the threshold percentage including at least one of:
a 10% reduction,
a 20% reduction,
a 30% reduction,
a 40% reduction,
a 50% reduction,
a 10% increase,
a 20% increase,
a 30% increase,
a 40% increase, or
a 50 increase.

19. The multispectral filter of claim 17, where the quarterwave thickness is a thickness associated with a center wavelength of light that is to be incident on at least one of the first one or more quarterwave stacks or the second one or more quarterwave stacks.

20. The multispectral filter of claim 17, where the thickness is detuned by an increase between 10% and 50%.

* * * * *